US012492223B2

(12) United States Patent
Gearing et al.

(10) Patent No.: US 12,492,223 B2
(45) Date of Patent: Dec. 9, 2025

(54) PEPTIDE COMPOSITIONS CAPABLE OF BINDING LANTHIONINE SYNTHETASE C-LIKE PROTEIN (LanCL) AND USES THEREOF

(71) Applicant: LATERAL IP PTY LTD, Melbourne (AU)

(72) Inventors: Andrew Gearing, Melbourne (AU); David Kenley, Melbourne (AU)

(73) Assignee: Lateral IP Pty Ltd, Melbourne (AU)

( * ) Notice: Subject to any disclaimer, the term of this patent is extended or adjusted under 35 U.S.C. 154(b) by 0 days.

(21) Appl. No.: 18/829,844

(22) Filed: Sep. 10, 2024

(65) Prior Publication Data

US 2025/0002534 A1    Jan. 2, 2025

Related U.S. Application Data

(63) Continuation of application No. 18/291,004, filed as application No. PCT/AU2022/050778 on Jul. 22, 2022.

(30) Foreign Application Priority Data

Jul. 23, 2021 (AU) ............................... 2021902267

(51) Int. Cl.
| | | |
|---|---|---|
| C07K 7/06 | (2006.01) | |
| A61K 38/00 | (2006.01) | |
| A61P 25/04 | (2006.01) | |
| A61P 31/16 | (2006.01) | |
| C07K 7/08 | (2006.01) | |

(52) U.S. Cl.
CPC ............... *C07K 7/06* (2013.01); *A61P 25/04* (2018.01); *A61P 31/16* (2018.01); *C07K 7/08* (2013.01); *A61K 38/00* (2013.01)

(58) Field of Classification Search
CPC ............ C07K 7/06; A61P 25/04; A61K 38/00
See application file for complete search history.

(56) References Cited

U.S. PATENT DOCUMENTS

| | | | | |
|---|---|---|---|---|
| 10,111,933 B2* | 10/2018 | Kenley | ............ | A61P 29/00 |
| 10,758,593 B2* | 9/2020 | Kenley | ............ | A61K 35/28 |
| 11,566,049 B2* | 1/2023 | Gearing | ............ | C07K 7/06 |
| 2007/0065514 A1* | 3/2007 | Howell | ............ | A61P 33/00 424/85.1 |
| 2015/0079044 A1* | 3/2015 | Kenley | ............ | A61P 5/06 514/11.4 |
| 2018/0141998 A1* | 5/2018 | Nguyen | ............ | G16B 20/20 |
| 2018/0143202 A1 | 5/2018 | Boniface et al. | | |
| 2019/0099472 A1* | 4/2019 | Kenley | ............ | A61P 43/00 |
| 2020/0390850 A1* | 12/2020 | Gearing | ............ | C07K 7/06 |
| 2021/0130410 A1 | 5/2021 | Gearing | | |
| 2022/0160815 A1 | 5/2022 | Kenley | | |
| 2023/0064978 A1 | 3/2023 | Gearing et al. | | |

FOREIGN PATENT DOCUMENTS

| | | | |
|---|---|---|---|
| EP | 3 671 210 A1 | 6/2020 | |
| RU | 2731919 C1 | 9/2020 | |
| RU | 2751964 C1 | 7/2021 | |
| WO | WO-02/18436 A1 | 3/2002 | |
| WO | WO-2007068039 A1 * | 6/2007 | ............ A61K 38/10 |
| WO | WO-2009013621 A2 * | 1/2009 | ........... A61K 31/713 |
| WO | WO-2009/094172 A2 | 7/2009 | |
| WO | WO-2013082667 A1 * | 6/2013 | ............ A61K 35/28 |
| WO | WO-2018/156808 A2 | 8/2018 | |
| WO | WO-2021/127752 A1 | 7/2021 | |

OTHER PUBLICATIONS

International Search Report and Written Opinion issued in PCT/AU2022/050778 (Oct. 12, 2022), 14 pages.
European Patent Office; Communication pursuant to Rule 164(1) EPC; European Patent Application No. 22844731.4; Jul. 7, 2025; 16 pages.

\* cited by examiner

*Primary Examiner* — Amber D Steele
(74) *Attorney, Agent, or Firm* — Foley & Lardner LLP

(57) ABSTRACT

A peptide capable of binding to Lanthionine synthetase C-like (LanCL) protein, wherein the peptide comprises an amino acid sequence of formula (I):

$$X_1\text{-}X_2\text{-}X_3\text{-}X_4\text{-}X_5\text{-}X_6 \qquad (I)$$

wherein:
(a) $X_1$ is selected from the group consisting of lysine, arginine and histidine, or $X_1$ is absent;
(b) $X_2$ is selected from the group consisting of alanine, valine, leucine, isoleucine, proline, phenylalanine, cysteine, tyrosine and serine;
(c) $X_3$ is selected from the group consisting of glycine, alanine, valine, leucine and isoleucine;
(d) $X_4$ is selected from the group consisting of serine, cysteine, threonine, asparagine, arginine, glutamine, tyrosine, aspartic acid, lysine, glutamic acid, proline and histidine, or $X_4$ is absent;
(e) $X_5$ is selected from the group consisting of serine, cysteine, threonine, asparagine, arginine, glutamine, tyrosine, lysine, histidine and glycine, or $X_5$ is absent; and
(f) $X_6$ is selected from the group consisting of serine, cysteine, threonine, asparagine, glutamine, tyrosine, and histidine, or $X_6$ is absent,
wherein the peptide is from 3 to 20 amino acids in length;
wherein the amino acid sequence of the peptide does not comprise CRSRPVESSC (SEQ ID NO:13), CRSVEGSCG (SEQ ID NO:7), or CRIIHNNNC (SEQ ID NO:24); and
wherein the peptide is not a linear peptide comprising the amino acid sequence EQLERALNSS (SEQ ID NO:65).

7 Claims, 5 Drawing Sheets

Specification includes a Sequence Listing.

PEPTIDE COMPOSITIONS CAPABLE OF BINDING LANTHIONINE SYNTHETASE C-LIKE PROTEIN (LanCL) AND USES THEREOF

CROSS-REFERENCE TO RELATED APPLICATIONS

The present application is a continuation of U.S. application Ser. No. 18/291,004, filed Jan. 22, 2024, which is the U.S. National Stage of International Application No. PCT/AU2022/050778, filed Jul. 22, 2022, and claims priority to Australian Patent Application No. 2021902267, filed Jul. 23, 2021.

SEQUENCE LISTING

The instant application contains a Sequence Listing which has been submitted electronically in XML format and is hereby incorporated by reference in its entirety. Said XML file, created on Aug. 26, 2024, is named "35610912 Sequence Listing-27 Aug. 2024.xml" and is 70.6 KB in size.

FIELD OF THE INVENTION

The invention relates generally to peptides suitable for treating conditions such as pain, inflammatory conditions and respiratory infection, and uses thereof.

BACKGROUND

All references, including any patent or patent application cited in this specification are hereby incorporated by reference to enable full understanding of the invention. Nevertheless, such references are not to be read as constituting an admission that any of these documents forms part of the common general knowledge in the art, in Australia or in any other country.

As noted by Lee et al. (*Int J Mol Sci.* 2019; 20(10): 2383), protein-protein interactions (PPIs) are the foundation of almost all cellular process. Those biochemical processes are often comprised of activated receptors that indirectly or directly regulate a series of cell signalling events that modulate transcription of nucleic acids and/or post-translational modification of translated proteins. Drugs that bind specifically to such receptors can act as agonists or antagonists, with downstream consequences on cellular behaviour. Peptides and small molecules that interfere with PPIs are therefore sought after as therapeutic agents due to their potential to modulate disease-associated protein interactions. The authors note that better identification of targetable disease-associated PPIs and optimization of peptide drug binding characteristics will likely be key to their clinical success. However, understanding the molecular recognition mechanism and delineating binding affinity for PPIs is a complex challenge for both computational biologists and protein biochemists, largely because small molecules are superior in binding to deep folding pockets of proteins when compared to larger, flat and hydrophobic binding interfaces that are commonly present at PPI complex interfaces. Although antibodies are generally more effective at recognizing those PPI interfaces, they are generally unable to penetrate the cell membrane to reach and recognize intracellular targets. The authors note that, more recently, peptides with balanced conformational flexibility and binding affinity that are up to five times larger than small molecule drugs have attracted considerable attention. Cyclic peptides, for example have small molecule drug properties such as long in vivo stability, while maintaining robust antibody-like binding affinity and minimal toxicity.

de la Torre and Albericio (2020; Molecules; 25(10): 2293) reported that the peptide-based drug discovery field has recently shown significant activity, noting that, from 2015 to 2019, the U.S. Food Drug Administration (FDA) had authorized 208 new drugs, of which 150 were new chemical entities and 58 were biologics, including 15 peptides or peptide-containing molecules. These include Ixazomib (an N-Acylated, C-boronic acid dipeptide for the treatment of multiple myeloma), Adlyxin (a 34 amino acid analog of parathyroid hormone-related protein for the treatment of osteoporosis), Etelcalcetide for the treatment of Hyperparathyroidism) and Afamelanotide (a 13 amino acid linear peptide analog of α-Melanocyte-stimulating hormone (αMSH) for the treatment of skin damage and pain). The authors note that oncology, metabolism and endocrinology are the most frequent indications for peptide-based therapeutics approved by the FDA, although cardiovascular, gastroenterology, bone diseases, dermatology and sexual dysfunction are also targeted indications for FDA-approved, peptide-based therapeutics.

In comparison to small molecules, such as proteins and antibodies, peptides represent a unique class of pharmaceutical compounds attributed to their distinct biochemical and therapeutic characteristics. In addition to peptide-based natural hormone analogs, peptides have been developed as drug candidates to disrupt protein-protein interactions (PPIs) and target or inhibit intracellular molecules such as receptor tyrosine kinases. These strategies have turned peptide therapeutics into a leading industry with nearly 20 new peptide-based clinical trials annually. In fact, there are currently more than 400 peptide drugs that are under global clinical developments with over 60 already approved for clinical use in the United States, Europe and Japan.

While there have been considerable advances in peptide-based therapeutics, they have been largely limited to the treatment of specific diseases and conditions, commensurate with the PPI and cell signaling pathways that are targeted by these peptide-based therapeutics. Hence, there remains an ongoing need for broad-spectrum, peptide-based treatment strategies that are capable of advantageously alleviating multiple diseases, conditions or symptoms thereof, including those associated with ageing, damage or stress to cells. The present invention solves, or at least partly alleviates, this limitation by providing therapeutic peptides with broad-spectrum activity, such as analgesic, anti-inflammatory and anti-microbial activity.

SUMMARY OF THE INVENTION

In an aspect disclosed herein, there is provided a peptide capable of binding to Lanthionine synthetase C-like (LanCL) protein, wherein the peptide comprises an amino acid sequence of formula (I):

$$X_1\text{-}X_2\text{-}X_3\text{-}X_4\text{-}X_5\text{-}X_6 \qquad (I)$$

wherein:
$X_1$ is selected from the group consisting of lysine, arginine and histidine, or $X_1$ is absent;
$X_2$ is selected from the group consisting of alanine, valine, leucine, isoleucine, proline, phenylalanine, cysteine, tyrosine and serine;
$X_3$ is selected from the group consisting of glycine, alanine, valine, leucine and isoleucine;

$X_4$ is selected from the group consisting of serine, cysteine, threonine, asparagine, arginine, glutamine, tyrosine, aspartic acid, lysine, glutamic acid, proline and histidine, or $X_4$ is absent;

$X_5$ is selected from the group consisting of serine, cysteine, threonine, asparagine, arginine, glutamine, tyrosine, lysine, histidine and glycine, or $X_5$ is absent; and $X_6$ is selected from the group consisting of serine, cysteine, threonine, asparagine, glutamine, tyrosine, and histidine, or $X_6$ is absent.

wherein the peptide is from 3 to 20 amino acids in length;

wherein the amino acid sequence of the peptide does not comprise CRSRPVESSC (SEQ ID NO: 13), CRSVEGSCG (SEQ ID NO:7), or CRIIHNNNC (SEQ ID NO:24); and wherein the peptide is not a linear peptide comprising the amino acid sequence EQLERALNSS (SEQ ID NO:65).

In another aspect disclosed herein, there is provided a peptide capable of binding to Lanthionine synthetase C-like (LanCL) protein, wherein the peptide comprises an amino acid sequence of formula (I):

$$X_1\text{-}X_2\text{-}X_3\text{-}X_4\text{-}X_5\text{-}X_6 \qquad (I)$$

wherein:

$X_1$ is selected from the group consisting of lysine, arginine and histidine;

$X_2$ is selected from the group consisting of alanine, valine, leucine, isoleucine, proline, phenylalanine, cysteine, tyrosine and serine;

$X_3$ is selected from the group consisting of glycine, alanine, valine, leucine and isoleucine;

$X_4$ is selected from the group consisting of serine, cysteine, threonine, asparagine, arginine, glutamine, tyrosine, aspartic acid, lysine, glutamic acid, proline and histidine, or $X_4$ is absent;

$X_5$ is selected from the group consisting of serine, cysteine, threonine, asparagine, arginine, glutamine, tyrosine, lysine, histidine and glycine, or $X_5$ is absent; and $X_6$ is selected from the group consisting of serine, cysteine, threonine, asparagine, glutamine, tyrosine, and histidine, or $X_6$ is absent.

wherein the peptide is from 3 to 20 amino acids in length;

wherein the amino acid sequence of the peptide does not comprise CRSRPVESSC (SEQ ID NO: 13), CRSVEGSCG (SEQ ID NO:7), or CRIIHNNNC (SEQ ID NO:24); and wherein the peptide is not a linear peptide comprising the amino acid sequence EQLERALNSS (SEQ ID NO:65).

DETAILED DESCRIPTION OF THE INVENTION

Figure 1:
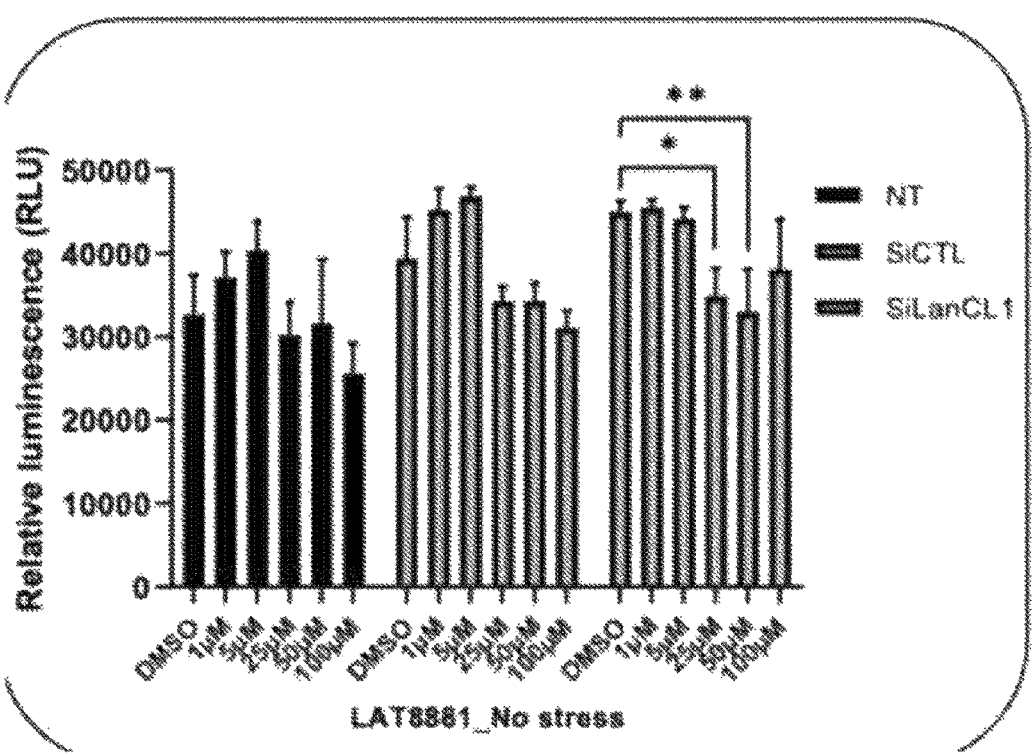
FIG. 1 shows the effect of the peptide of SEQ ID NO:1 on the viability of Taxol-stressed A549 adenocarcinoma human alveolar basal epithelial cells. Cells were treated with LanCL1 siRNA (100 nM for 48 hrs) to knockdown LanCL1 expression. Cells were then incubated in the presence of Taxol ($IC_{50}$~350 μM), either in the presence of vehicle alone (dimethylsulfoxide; DMSO) or in the presence of the peptide of SEQ ID NO:1 (diluted in DMSO) at a concentration of 1, 5, 25, 50 and 100 μM. Y-axis shows Relative luminescence Units (RLU); X-axis shows concentration of peptide.
Figure 1:
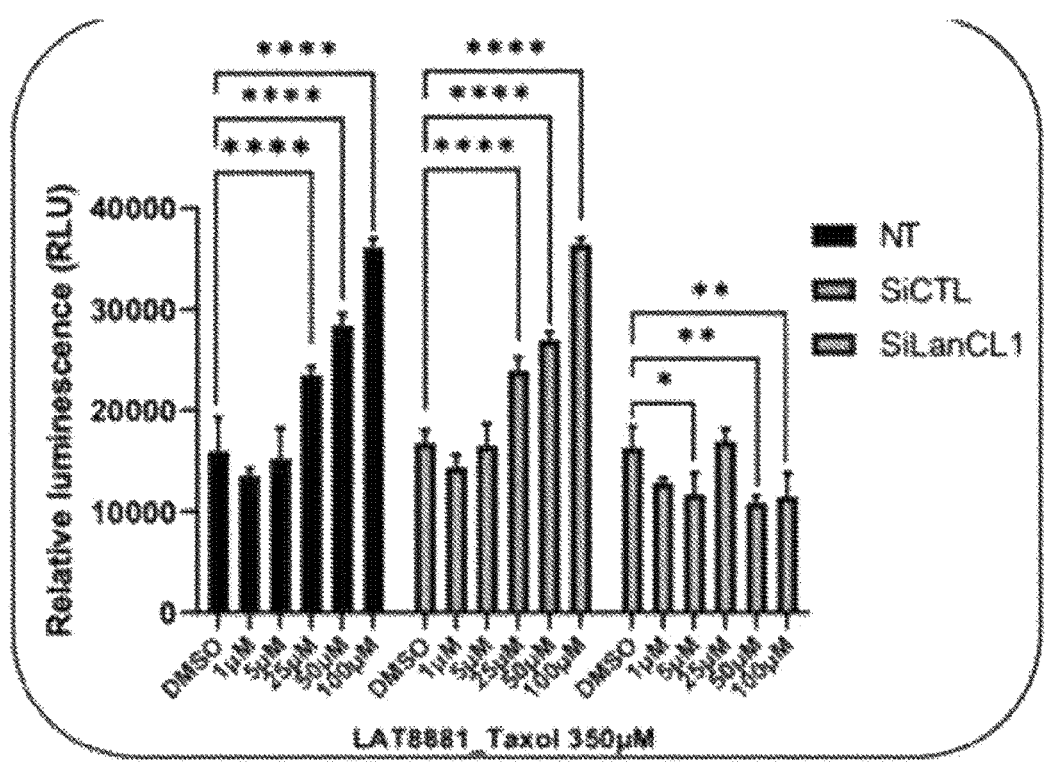

Unless defined otherwise, all technical and scientific terms used herein have the same meaning as commonly understood by those of ordinary skill in the art to which the invention belongs. Although any methods and materials similar or equivalent to those described herein can be used in the practice or testing of the present invention, preferred methods and materials are described. For the purposes of the present invention, the following terms are defined below.

The articles "a" and "an" are used herein to refer to one or to more than one (i.e., to at least one) of the grammatical object of the article. By way of example, "an element" means one element or more than one element.

As used herein, the term "about" refers to a quantity, level, value, dimension, size, or amount that varies by as much as 10% (e.g, by 10%, 9%, 8%, 7%, 6%, 5%, 4%, 3%, 2% or 1%) to a reference quantity, level, value, dimension, size, or amount.

Throughout this specification, unless the context requires otherwise, the words "comprise", "comprises" and "comprising" will be understood to imply the inclusion of a stated step or element or group of steps or elements but not the exclusion of any other step or element or group of steps or elements.

Peptides

The present inventors had previously identified the molecular target (Lanthionine synthetase C-like protein; LanCL) of a new class of cyclic peptide molecules to which analgesic and other therapeutic properties had previously been ascribed. That work is described in WO2021/127752. The present inventors have since identified a novel consensus sequence (formula (I)) for peptides that unexpectedly retain at least some of the biological activity previously ascribed to this class of cyclic, LanCL-binding peptides, including analgesic, anti-inflammatory and anti-microbial activity. Moreover, the present inventors have unexpectedly found that many peptides comprising this consensus sequence will retain biological activity, irrespective of whether they are presented in a cyclic or linear peptide configuration. Thus, in an aspect disclosed herein, there is provided a peptide capable of binding to Lanthionine synthetase C-like (LanCL) protein, wherein the peptide comprises an amino acid sequence of formula (I):

$$X_1\text{-}X_2\text{-}X_3\text{-}X_4\text{-}X_5\text{-}X_6 \qquad (I)$$

wherein:

$X_1$ is selected from the group consisting of lysine, arginine and histidine;

$X_2$ is selected from the group consisting of alanine, valine, leucine, isoleucine, proline, phenylalanine, cysteine, tyrosine and serine;

$X_3$ is selected from the group consisting of glycine, alanine, valine, leucine and isoleucine;

$X_4$ is selected from the group consisting of serine, cysteine, threonine, asparagine, arginine, glutamine, tyrosine, aspartic acid, lysine, glutamic acid, proline and histidine, or $X_4$ is absent;

$X_5$ is selected from the group consisting of serine, cysteine, threonine, asparagine, arginine, glutamine, tyrosine, lysine, histidine and glycine, or $X_5$ is absent; and $X_6$ is selected from the group consisting of serine, cysteine, threonine, asparagine, glutamine, tyrosine, and histidine, or $X_6$ is absent.

wherein the peptide is from 3 to 20 amino acids in length;

wherein the amino acid sequence of the peptide does not comprise CRSRPVESSC (SEQ ID NO: 13), CRSVEGSCG (SEQ ID NO:7), or CRIIHNNNC (SEQ ID NO:24); and wherein the peptide is not a linear peptide comprising the amino acid sequence EQLERALNSS (SEQ ID NO:65).

In an embodiment, $X_1$ is arginine. In an embodiment, the peptide is not a linear peptide comprising the amino acid sequence QEQLERALNSS (SEQ ID NO:37).

The present inventors have also unexpectedly shown that the peptides described herein unexpectedly retain at least some of the biological activity previously ascribed to this class of cyclic, LanCL-binding peptides, including analgesic, anti-inflammatory and anti-microbial activity, even in the absence of $X_1$. Thus, in an embodiment described herein, $X_1$ is absent.

In another aspect disclosed herein, there is provided a peptide capable of binding to Lanthionine synthetase C-like (LanCL) protein, wherein the peptide comprises an amino acid sequence of formula (I):

$$X_1\text{-}X_2\text{-}X_3\text{-}X_4\text{-}X_5\text{-}X_6 \qquad (I)$$

wherein:

$X_1$ is selected from the group consisting of lysine, arginine and histidine, or $X_1$ is absent;

$X_2$ is selected from the group consisting of alanine, valine, leucine, isoleucine, proline, phenylalanine, cysteine, tyrosine and serine;

$X_3$ is selected from the group consisting of glycine, alanine, valine, leucine and isoleucine;

$X_4$ is selected from the group consisting of serine, cysteine, threonine, asparagine, arginine, glutamine, tyrosine, aspartic acid, lysine, glutamic acid, proline and histidine, or $X_4$ is absent;

$X_5$ is selected from the group consisting of serine, cysteine, threonine, asparagine, arginine, glutamine, tyrosine, lysine, histidine and glycine, or $X_5$ is absent; and $X_6$ is selected from the group consisting of serine, cysteine, threonine, asparagine, glutamine, tyrosine, and histidine, or $X_6$ is absent.

wherein the peptide is from 3 to 20 amino acids in length;

wherein the amino acid sequence of the peptide does not comprise CRSRPVESSC (SEQ ID NO: 13), CRSVEGSCG (SEQ ID NO:7), or CRIIHNNNC (SEQ ID NO:24); and wherein the peptide is not a linear peptide comprising the amino acid sequence EQLERALNSS (SEQ ID NO:65).

In an embodiment, the peptide is not a linear peptide comprising the amino acid sequence QEQLERALNSS (SEQ ID NO:37).

In an embodiment, the amino acid sequence of the peptide does not comprise CRSRPVESSC (SEQ ID NO:13), CRSVEGSCG (SEQ ID NO:7), CRIIHNNNC (SEQ ID NO: 24), CRRFVESSCA (SEQ ID NO:6) or CRIVYDSNC (SEQ ID NO:26).

In an embodiment, $X_2$ is selected from the group consisting of alanine, isoleucine, proline, phenylalanine and serine.

In an embodiment, $X_3$ is selected from the group consisting of valine, leucine and isoleucine.

In an embodiment, $X_4$ is selected from the group consisting of asparagine, glutamic acid and histidine, or $X_4$ is absent. In an embodiment, $X_4$ is selected from the group consisting of asparagine, glutamic acid, proline and histidine. In an embodiment, $X_4$ is absent.

In an embodiment, $X_5$ is selected from the group consisting of serine, asparagine and glycine, or $X_5$ is absent. In an embodiment, $X_5$ is selected from the group consisting of serine, asparagine and glycine. In an embodiment, $X_5$ is absent.

In an embodiment, $X_6$ is serine or asparagine, or $X_6$ is absent. In an embodiment, $X_6$ is serine or asparagine. In an embodiment, $X_6$ is absent.

In an embodiment, $X_1$ is selected from the group consisting of lysine, arginine and conservative amino acid substitutions of any of the foregoing; $X_2$ is selected from the group consisting of alanine, isoleucine, proline, serine and conservative amino acid substitutions of any of the foregoing; $X_3$ is selected from the group consisting of valine, leucine, isoleucine and conservative amino acid substitutions of any of the foregoing; $X_4$ is selected from the group consisting of asparagine, glutamic acid, proline and conservative amino acid substitutions of any of the foregoing, or $X_4$ is absent; $X_5$ is selected from the group consisting of serine, glutamine and conservative amino acid substitutions of any of the foregoing, or $X_5$ is absent; and $X_6$ is serine or a conservative amino acid substitution thereof, or $X_6$ is absent.

In an embodiment, $X_1$ is absent or is selected from the group consisting of lysine, arginine and conservative amino acid substitutions of any of the foregoing; $X_2$ is selected from the group consisting of alanine, isoleucine, proline, serine and conservative amino acid substitutions of any of the foregoing; $X_3$ is selected from the group consisting of valine, leucine, isoleucine and conservative amino acid substitutions of any of the foregoing; $X_4$ is selected from the group consisting of asparagine, glutamic acid, proline and conservative amino acid substitutions of any of the foregoing, or $X_4$ is absent; $X_5$ is selected from the group consisting of serine, glutamine and conservative amino acid substitutions of any of the foregoing, or $X_5$ is absent; and $X_6$ is serine or a conservative amino acid substitution thereof, or $X_6$ is absent.

In an embodiment, $X_1$ is lysine or arginine; $X_2$ is selected from the group consisting of alanine, isoleucine, proline and serine; $X_3$ is selected from the group consisting of valine, leucine and isoleucine; $X_4$ is asparagine, proline or glutamic acid, or $X_4$ is absent; $X_5$ is serine or glutamine, or $X_5$ is absent; and $X_6$ is serine, or $X_6$ is absent.

In an embodiment, $X_1$ is absent, or $X_1$ is lysine or arginine; $X_2$ is selected from the group consisting of alanine, isoleucine, proline and serine; $X_3$ is selected from the group consisting of valine, leucine and isoleucine; $X_4$ is asparagine, proline or glutamic acid, or $X_4$ is absent; $X_5$ is serine or glutamine, or $X_5$ is absent; and $X_6$ is serine, or $X_6$ is absent.

In an embodiment, the peptide comprises the amino acid sequence selected from the group consisting of RAL, RALN (SEQ ID NO:60), RALNS (SEQ ID NO:59), RALNSS (SEQ ID NO: 48), RSV, RSVE (SEQ ID NO:57), RSVEG (SEQ ID NO:56), RSVEGS (SEQ ID NO: 9), RPV, RPVE (SEQ ID NO:66), RPVES (SEQ ID NO:67), RPVESS (SEQ ID NO:23), RII, RIIH (SEQ ID NO:68), RIIHN (SEQ ID NO:69), and RIIHNN (SEQ ID NO:29).

In an embodiment, the peptide consists of the amino acid sequence selected from the group consisting of RAL, RALN (SEQ ID NO:60), RALNS (SEQ ID NO:59), RALNSS (SEQ ID NO: 48), RSV, RSVE (SEQ ID NO:57), RSVEG (SEQ ID NO:56), RSVEGS (SEQ ID NO: 9), RPV, RPVE (SEQ ID NO:66), RPVES (SEQ ID NO:67), RPVESS (SEQ ID NO:23), RII, RIIH (SEQ ID NO:68), RIIHN (SEQ ID NO:69), and RIIHNN (SEQ ID NO:29).

In an embodiment, the peptide comprises the amino acid sequence ALNSS (SEQ ID NO: 63). In an embodiment, the peptide consists of the amino acid sequence ALNSS (SEQ ID NO: 63).

In an embodiment, the peptide comprises the amino acid sequence KALPRS (SEQ ID NO: 42). In an embodiment, the peptide consists of the amino acid sequence KALPRS (SEQ ID NO: 42).

In an embodiment, the peptide comprises the amino acid sequence RALNSS (SEQ ID NO: 48).

In an embodiment, the peptide consists of the amino acid sequence RALNSS (SEQ ID NO: 48).

In an embodiment, the peptide comprises the amino acid sequence CRALNSSC (SEQ ID NO: 40).

In an embodiment, the peptide consists of the amino acid sequence CRALNSSC (SEQ ID NO:40).

In an embodiment, the peptide is capable of competing for binding to LanCL with a peptide consisting of the amino acid sequence CRSVEGSCG (SEQ ID NO:3).

As described elsewhere herein, the present inventors have unexpectedly shown that peptides of as little as 3 amino acids in length and comprising the amino acid sequence of formula (i) will retain biological activity. In an embodiment disclosed herein, the peptide is from 3 to 19 amino acid residues in length, preferably from 3 to 18 amino acid residues in length, preferably from 3 to 17 amino acid residues in length, preferably from 3 to 16 amino acid residues in length, preferably from 3 to 15 amino acid residues in length, preferably from 3 to 14 amino acid residues in length, preferably from 3 to 13 amino acid residues in length, preferably from 3 to 12 amino acid residues in length, preferably from 3 to 11 amino acid residues in length, preferably from 3 to 10 amino acid residues in length, preferably from 3 to 9 amino acid residues in length, preferably from 3 to 8 amino acid residues in length, preferably from 3 to 7 amino acid residues in length, preferably from 3 to 6 amino acid residues in length, preferably from 3 to 5 amino acid residues in length, preferably 3 or 4 amino acid residues in length, or preferably 3 amino acid residues in length. In an embodiment, the peptide is 20 amino acid residues in length. In an embodiment, the peptide is 19 amino acid residues in length. In an embodiment, the peptide is 18 amino acid residues in length. In an embodiment, the peptide is 17 amino acid residues in length. In an embodiment, the peptide is 16 amino acid residues in length. In an embodiment, the peptide is 15 amino acid residues in length. In an embodiment, the peptide is 14 amino acid residues in length. In an embodiment, the peptide is 13 amino acid residues in length. In an embodiment, the peptide is 12 amino acid residues in length. In an embodiment, the peptide is 11 amino acid residues in length. In an embodiment, the peptide is 10 amino acid residues in length. In an embodiment, the peptide is 9 amino acid residues in length. In an embodiment, the peptide is 8 amino acid residues in length. In an embodiment, the peptide is 7 amino acid residues in length. In an embodiment, the peptide is 6 amino acid residues in length. In an embodiment, the peptide is 5 amino acid residues in length. In an embodiment, the peptide is 4 amino acid residues in length. In an embodiment, the peptide is 3 amino acid residues in length.

The peptides described herein may suitably comprise naturally-occurring amino acid residues, proteogenic or non-proteogenic. These amino acids will typically have L-stereochemistry. Naturally occurring amino acids are set out in Table 1, below.

TABLE 1

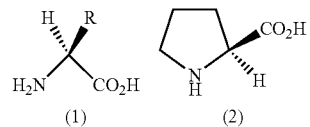

| Amino Acid | Three-letter Abbreviation | One-letter symbol | Structure of side chain (R) in (1) above |
|---|---|---|---|
| Alanine | Ala | A | —$CH_3$ |
| Arginine | Arg | R | —$(CH_2)_3NHC(=N)NH_2$ |
| Asparagine | Asn | N | —$CH_2CONH_2$ |
| Aspartic acid | Asp | D | —$CH_2CO_2H$ |
| Cysteine | Cys | C | —$CH_2SH$ |
| Glutamine | Gln | Q | —$(CH_2)_2CONH_2$ |
| Glutamic acid | Glu | E | —$(CH_2)_2CO_2H$ |
| Glycine | Gly | G | —H |
| Histidine | His | H | —$CH_2$(4-imidazolyl) |
| Isoleucine | Ile | I | —$CH(CH_3)CH_2CH_3$ |
| Leucine | Leu | L | —$CH_2CH(CH_3)_2$ |
| Lysine | Lys | K | —$(CH_2)_4NH_2$ |
| Methionine | Met | M | —$(CH_2)_2SCH_3$ |
| Phenylalanine | Phe | F | —$CH_2Ph$ |
| Ornithine | Orn | O | —$(CH_2)_3NH_2$ |
| Proline | Pro | P | see formula (2) above for structure of amino acid |
| Serine | Ser | S | —$CH_2OH$ |
| Threonine | Thr | T | —$CH(CH_3)OH$ |
| Tryptophan | Trp | W | —$CH_2$(3-indolyl) |
| Tyrosine | Tyr | Y | —$CH_2$(4-hydroxyphenyl) |
| Valine | Val | V | —$CH(CH_3)_2$ |

As used herein, the term "alkyl" refers to a straight chain or branched saturated hydrocarbon group having 1 to 10 carbon atoms. Where appropriate, the alkyl group may have a specified number of carbon atoms, for example, $C_{1-6}$alkyl which includes alkyl groups having 1, 2, 3, 4, 5 or 6 carbon atoms in a linear or branched arrangement. Examples of suitable alkyl groups include, but are not limited to, methyl, ethyl, n-propyl, i-propyl, n-butyl, i-butyl, t-butyl, n-pentyl, 2-methylbutyl, 3-methylbutyl, 4-methylbutyl, n-hexyl, 2-methylpentyl, 3-methylpentyl, 4-methylpentyl, 5-methylpentyl, 2-ethylbutyl, 3-ethylbutyl, heptyl, octyl, nonyl and decyl.

As used herein, the term "alkenyl" refers to a straight-chain or branched hydrocarbon group having one or more double bonds between carbon atoms and having 2 to 10 carbon atoms. Where appropriate, the alkenyl group may have a specified number of carbon atoms. For example, $C_2$-$C_6$ as in "$C_2$-$C_6$alkenyl" includes groups having 2, 3, 4, 5 or 6 carbon atoms in a linear or branched arrangement. Examples of suitable alkenyl groups include, but are not limited to, ethenyl, propenyl, isopropenyl, butenyl, butadienyl, pentenyl, pentadienyl, hexenyl, hexadienyl, heptenyl, octenyl, nonenyl and decenyl.

As used herein, the term "alkynyl" refers to a straight-chain or branched hydrocarbon group having one or more triple bonds and having 2 to 10 carbon atoms. Where appropriate, the alkynyl group may have a specified number of carbon atoms. For example, $C_2$-$C_6$ as in "$C_2$-$C_6$alkynyl" includes groups having 2, 3, 4, 5 or 6 carbon atoms in a linear or branched arrangement. Examples of suitable alkynyl groups include, but are not limited to ethynyl, propynyl, butynyl, pentynyl and hexynyl.

As used herein, the term "cycloalkyl" refers to a saturated and unsaturated (but not aromatic) cyclic hydrocarbon. The cycloalkyl ring may include a specified number of carbon atoms. For example, a 3 to 8 membered cycloalkyl group includes 3, 4, 5, 6, 7 or 8 carbon atoms. Examples of suitable cycloalkyl groups include, but are not limited to, cyclopropyl, cyclobutyl, cyclopentyl, cyclopentenyl, cyclohexyl, cyclohexenyl, cyclohexadienyl, cycloheptyl and cyclooctyl.

As used herein, the term "aryl" is intended to mean any stable, monocyclic, bicyclic or tricyclic carbon ring system of up to 7 atoms in each ring, wherein at least one ring is aromatic. Examples of such aryl groups include, but are not limited to, phenyl, naphthyl, tetrahydronaphthyl, indanyl, fluorenyl, phenanthrenyl, biphenyl and binaphthyl.

In an embodiment, the peptide comprises one or more D-amino acids. In another embodiment, one or more of the amino acids of formula (I) is a D-amino acid.

As noted elsewhere herein, the present inventors have unexpectedly found that the peptides described herein will retain biological activity irrespective of whether they are presented in a cyclic or linear peptide configuration. Thus, in one embodiment, the peptide is a linear peptide. In another embodiment, the peptide is a cyclic peptide. Persons skilled in the art will be familiar with methods suitable for forming cyclic peptides, illustrative examples of which are described in Choi and Joo (*Biomol Ther* (*Seoul*). 2020; 28(1): 18-24), the contents of which are incorporate herein by reference.

In an embodiment, peptide is cyclized by a disulphide bond between two cysteine residues. In an embodiment, the disulphide bond is formed between the two cysteine residues, wherein the two cysteine residues are at positions immediately adjacent the C-terminal ($X_6$) and the N-terminal ($X_1$) residues of formula (I); that is, the peptide will comprise an amino acid sequence cysteine-$X_1$-$X_2$-$X_3$-$X_4$-$X_5$-$X_6$-cysteine. Alternatively, the disulphide bond is formed between the two cysteine residues, wherein one or both cysteine residues are distal to the C-terminal ($X_6$) and the N-terminal ($X_1$) residues of formula (I). For example, the peptide may comprise an amino acid sequence cysteine-Y-$X_1$-$X_2$-$X_3$-$X_4$-$X_5$-$X_6$-cysteine or cysteine-$X_1$-$X_2$-$X_3$-$X_4$-$X_5$-$X_6$-Y-cysteine or cysteine-Y-$X_1$-$X_2$-$X_3$-$X_4$-$X_5$-$X_6$-Y-cysteine, where Y is one or more amino acid residues. In another example, the peptide may comprise an amino acid sequence cysteine-Y-$X_2$-$X_3$-$X_4$-$X_5$-$X_6$-cysteine or cysteine-$X_2$-$X_3$-$X_4$-$X_5$-$X_6$-Y-cysteine or cysteine-Y-$X_2$-$X_3$-$X_4$-$X_5$-$X_6$-Y-cysteine, where Y is one or more amino acid residues. In an embodiment, the cyclic peptide is formed by a disulphide bond between two cysteine residues.

As described elsewhere herein, the present inventors have unexpectedly found that certain cyclic peptides comprising the amino acid sequence of formula (I) have greater biological activity when compared to their linear counterpart. For example, the inventors have shown that the cyclic peptide CQEQLERALNSSC (SEQ ID NO:38), cyclized by a disulphide bond between the two cysteine residues, has greater binding affinity to LanCL and is more efficacious in vivo in an animal model of influenza A respiratory tract infection when compared to the non-cyclized counterpart, QEQLERALNSS (SEQ ID NO:37). Thus, in an embodiment, the cyclic peptide comprises the amino acid sequence CQEQLERALNSSC (SEQ ID NO:38). In an embodiment, the cyclic peptide consists of the amino acid sequence CQEQLERALNSSC (SEQ ID NO:38).

The peptides described herein may be made by suitable methods well known to persons skilled in the art, illustrative examples of which include by solution or solid phase synthesis using Fmoc or Boc protected amino acid residues and recombinant techniques as known in the art using standard microbial culture technology, genetically engineered microbes and recombinant DNA technology (Sambrook and Russell, Molecular Cloning: A Laboratory Manual ($3^{rd}$ Edition), 2001, CSHL Press).

In an embodiment, the peptides described herein are formed as a pharmaceutically acceptable salt. It is to be understood that non-pharmaceutically acceptable salts are also envisaged, since these may be useful as intermediates in the preparation of pharmaceutically acceptable salts or may be useful during storage or transport. Suitable pharmaceutically acceptable salts will be familiar to persons skilled in the art, illustrative examples of which include salts of pharmaceutically acceptable inorganic acids, such as hydrochloric, sulphuric, phosphoric, nitric, carbonic, boric, sulfamic, and hydrobromic acids, or salts of pharmaceutically acceptable organic acids, such as acetic, propionic, butyric, tartaric, maleic, hydroxymaleic, fumaric, maleic, citric, lactic, mucic, gluconic, benzoic, succinic, oxalic, phenylacetic, methanesulphonic, toluenesulphonic, benezenesulphonic, salicylic sulphanilic, aspartic, glutamic, edetic, stearic, palmitic, oleic, lauric, pantothenic, tannic, ascorbic and valeric acids. Illustrative examples of suitable base salts include those formed with pharmaceutically acceptable cations, such as sodium, potassium, lithium, calcium, magnesium, ammonium and alkylammonium. Basic nitrogen-containing groups may be quaternized with such agents as lower alkyl halide, such as methyl, ethyl, propyl, and butyl chlorides, bromides and iodides; dialkyl sulfates like dimethyl and diethyl sulfate; and others.

Also disclosed herein are prodrugs comprising the peptide described herein, or the pharmaceutically acceptable salts thereof. As used herein, a "prodrug" typically refers to a compound that can be metabolized in vivo to provide or release the active peptide described herein, or pharmaceutically acceptable salts thereof. In an embodiment, the prodrug itself also shares the same, or substantially the same, therapeutic activity as the peptide described herein, or pharmaceutically acceptable salts thereof, as described elsewhere herein.

In some embodiments, the peptides described herein, or pharmaceutically acceptable salts thereof, may further comprise a C-terminal capping group. The term "C-terminal capping group", as used herein, refers to a group that blocks the reactivity of the C-terminal carboxylic acid. Suitable C-terminal capping groups form amide groups or esters with the C-terminal carboxylic acid, for example, the C-terminal capping group forms a —C(O)NHR$^a$ or —C(O)OR$^b$ where the C(O) is from the C-terminal carboxylic acid group and R$^a$ is hydrogen, alkyl, alkenyl, alkynyl, cycloalkyl or aryl and Rb is alkyl, alkenyl, alkynyl, cycloalkyl or aryl. In particular embodiments, the C-terminal capping group is —$NH_2$, forming —C(O)$NH_2$. In some embodiments, the peptide described herein, or pharmaceutically acceptable salts thereof, comprise a C-terminal polyethylene glycol (PEG). In an embodiment, the PEG has a molecular weight in the range of 220 to 5500 Da, preferably 220 to 2500 Da, more preferably 570 to 1100 Da.

In some embodiments, the peptides described herein, or pharmaceutically acceptable salts thereof, may further comprise an N-terminal capping group. The term "N-terminal capping group", as used herein, refers to a group that blocks the reactivity of the N-terminal amino group. Suitable N-terminal capping groups are acyl groups that form amide groups with the N-terminal amino group, for example, the N-terminal capping group forms a —NHC(O)$R^a$ where the NH is from the N-terminal amino group and $R^a$ is alkyl, alkenyl, alkynyl, cycloalkyl or aryl. In particular embodiments, the N-terminal capping group is —C(O)CH$_3$ (acyl), forming —NHC(O)CH$_3$.

In some embodiments, the peptides described herein, or pharmaceutically acceptable salts thereof, may comprise a C-terminal capping group and an N-terminal capping group, as herein described. It is to be understood that the peptides disclosed herein do not include the full length amino acid sequence of human growth hormone or of a non-human isoform thereof.

Methods of Treatment and Prophylaxis

As described elsewhere herein, the present inventors have surprisingly found that the peptides described herein have advantageous properties that make them useful for therapeutic use, including for treating conditions associated with ageing, damage and stress to cells. Illustrative examples of such conditions include ageing, pain, inflammatory conditions/inflammation and microbial infection. The activities ascribed to the peptides described herein also make them useful as anti-ageing compounds. The peptides described herein can therefore suitably be used to treat, alleviate or otherwise abrogate the severity of such conditions in a subject in need thereof, including one or more symptoms thereof. Thus, the present disclosure extends to a method of treating a condition in a subject, the method comprising administering to a subject in need thereof a therapeutically-effective amount of the peptide described herein. Also provided is use of the peptides described herein in the manufacture of a medicament for treating a condition in a subject in need thereof. Also provided is the peptides described herein for use in the treatment of a condition in a subject in need thereof.

In an embodiment, the condition is selected from the group consisting of pain, an inflammatory airway disease, microbial infection, respiratory tract infection, migraine, sarcopenia, impaired glucose tolerance, diabetes, obesity, metabolic disease and obesity-related conditions, osteoarthritis, a disorder of muscle, a wasting disorder, ageing, cachexia, anorexia, AIDS wasting syndrome, muscular dystrophy, neuromuscular disease, amyotrophic lateral sclerosis (ALS), motor neuron disease, diseases of the neuromuscular junction, an ophthalmic condition, a condition of the central nervous system, including a neurodegenerative condition (e.g., Parkinson's disease, Alzheimer's disease), inflammatory myopathy, a burn, a wound, an injury or trauma, a condition associated with elevated LDL cholesterol, a condition associated with impaired chondrocyte, proteoglycan or collagen production or quality, a condition associated with impaired cartilage tissue formation or quality, a condition associated with impaired muscle, ligament or tendon mass, form or function, a condition associated with inflammation, trauma or a genetic abnormality affecting muscle or connective tissue, and a bone disorder.

The terms "treating", "treatment" and the like, are used interchangeably herein to mean relieving, reducing, alleviating, ameliorating or otherwise inhibiting the severity of the disease or condition, including one or more symptoms thereof. The terms "treating", "treatment" and the like are also used interchangeably herein to include preventing the disease or condition, including one or more symptoms thereof.

The terms "treating", "treatment" and the like also include preventing, relieving, reducing, alleviating, ameliorating or otherwise inhibiting the severity of the disease, condition and/or of one or more symptoms thereof for at least a period of time. It is to be understood that the terms "treating", "treatment" and the like do not imply that the disease, condition or one or more symptoms thereof are permanently prevented, relieved, reduced, alleviated, ameliorated or otherwise inhibited and therefore extend to the temporary prevention, relief, reduction, alleviation, amelioration or otherwise inhibition of the severity of the disease, condition or of one or more symptoms thereof.

The term "subject", as used herein, refers to a mammalian subject for whom treatment of the disease, condition or one or more symptoms thereof is desired. Illustrative examples of suitable subjects include primates, especially humans, companion animals such as cats and dogs and the like, working animals such as horses, donkeys and the like, livestock animals such as sheep, cows, goats, pigs and the like, laboratory test animals such as rabbits, mice, rats, guinea pigs, hamsters and the like and captive wild animals such as those in zoos and wildlife parks, deer, dingoes and the like. In an embodiment, the subject is a human.

It is to be understood that a reference to a subject herein does not imply that the subject has a disease, condition or one or more symptoms thereof, but also includes a subject that is at risk of developing a disease, condition or one or more symptoms thereof.

In an embodiment, the methods disclosed herein comprise administering the peptides, or pharmaceutically acceptable salts thereof, as described herein, to a human subject.

It is to be understood that the peptides described herein, or pharmaceutically acceptable salts thereof, are advantageously administered in a therapeutically effective amount. The phrase "therapeutically effective amount" typically means an amount necessary to attain the desired response. It would be understood by persons skilled in the art that the therapeutically effective amount of peptide will vary depending upon several factors, illustrative examples of which include the health and physical condition of the subject to be treated, the taxonomic group of subject to be treated, the severity of the disease, condition or symptom to be treated, the formulation of the composition comprising a peptide described herein, or a pharmaceutically acceptable salt thereof, the route of administration, and combinations of any of the foregoing.

A therapeutically effective amount will typically fall within a relatively broad range that can be determined through routine trials by persons skilled in the art. Illustrative examples of a suitable therapeutically effective amount of the peptides described herein, and pharmaceutically acceptable salts thereof, for administration to a human subject include from about 0.001 mg per kg of body weight to about 1 g per kg of body weight, preferably from about 0.001 mg per kg of body weight to about 50 g per kg of body weight, more preferably from about 0.01 mg per kg of body weight to about 1.0 mg per kg of body weight. In an embodiment disclosed herein, the therapeutically effective amount of the peptides described herein, and/or pharmaceutically acceptable salts thereof, is from about 0.001 mg per kg of body weight to about 1 g per kg of body weight per dose (e.g., 0.001 mg/kg, 0.005 mg/kg, 0.01 mg/kg, 0.05 mg/kg, 0.1 mg/kg, 0.15 mg/kg, 0.2 mg/kg, 0.25 mg/kg, 0.3 mg/kg, 0.35 mg/kg, 0.4 mg/kg, 0.45 mg/kg, 0.5 mg/kg, 0.5 mg/kg, 0.55 mg/kg, 0.6 mg/kg, 0.65 mg/kg, 0.7 mg/kg, 0.75 mg/kg, 0.8 mg/kg, 0.85 mg/kg, 0.9 mg/kg, 0.95 mg/kg, 1 mg/kg, 1.5 mg/kg, 2 mg/kg, 2.5 mg/kg, 3 mg/kg, 3.5 mg/kg, 4 mg/kg, 4.5 mg/kg, 5 mg/kg, 5.5 mg/kg, 6 mg/kg, 6.5 mg/kg, 7 mg/kg, 7.5 mg/kg, 8 mg/kg, 8.5 mg/kg, 9 mg/kg, 9.5 mg/kg, 10 mg/kg, 10.5 mg/kg, 11 mg/kg, 11.5 mg/kg, 12 mg/kg, 12.5 mg/kg, 13 mg/kg, 13.5 mg/kg, 14 mg/kg, 14.5 mg/kg, 15 mg/kg, 15.5 mg/kg, 16 mg/kg, 16.5 mg/kg, 17 mg/kg, 17.5 mg/kg, 18 mg/kg, 18.5 mg/kg, 19 mg/kg, 19.5 mg/kg, 20 mg/kg, 20.5 mg/kg, 21 mg/kg, 21.5 mg/kg, 22 mg/kg, 22.5 mg/kg, 23 mg/kg, 23.5 mg/kg, 24 mg/kg, 24.5 mg/kg, 25 mg/kg, 25.5 mg/kg, 26 mg/kg, 26.5 mg/kg, 27 mg/kg, 27.5 mg/kg, 28 mg/kg, 28.5 mg/kg, 29 mg/kg, 29.5 mg/kg, 30 mg/kg, 35 mg/kg, 40 mg/kg, 45 mg/kg, 50 mg/kg, 55 mg/kg, 60 mg/kg, 65 mg/kg, 70 mg/kg, 75 mg/kg, 80 mg/kg, 85 mg/kg, 90 mg/kg, 95 mg/kg, 100 mg/kg, 105 mg/kg, 110 mg/kg of body weight, etc). In an embodiment, the therapeutically effective amount of the peptides described herein, or the pharmaceutically acceptable salts thereof, is from about 0.001 mg to about 50 mg per kg of body weight. In an embodiment, the therapeutically effective amount of the peptides described herein, and pharmaceutically acceptable salts thereof, is from about 0.01 mg to about 100 mg per kg of body weight. In an embodiment, the therapeutically effective amount of the peptides described herein, or pharmaceutically acceptable salts thereof, is from about 0.1 mg to about 10 mg per kg of body weight, preferably from about 0.1 mg to about 5 mg per kg of body weight, more preferably from about 0.1 mg to about 1.0 mg per kg of body weight. Dosage regimes may be adjusted to provide the optimum therapeutic response. For example, several divided doses may be administered daily, weekly, monthly or other suitable time intervals, or the dose may be proportionally reduced as indicated by the exigencies of the situation.

Pain

As described elsewhere herein, the present inventors have found that the peptides described herein have advantageous analgesic properties, including in alleviating neuropathic pain. Thus, in an embodiment, the condition is pain. In an embodiment, the condition is neuropathic pain.

Without being bound by theory, or by a particular mode of application, neuropathic pain is typically characterised as pain which results from damage by injury or disease to nerve tissue or neurons per se or of dysfunction within nerve tissue. The pain may be peripheral, central or a combination thereof; in other words, the term "neuropathic pain" typically refers to any pain syndrome initiated or caused by a primary lesion or dysfunction in the peripheral or central nervous system. Neuropathic pain is also distinguishable in that it typically does not respond effectively to treatment by common pain medication such as opioids. By contrast, nociceptive pain is characterised as pain which results from stimulation of nociceptors by noxious or potentially harmful stimuli that may cause damage or injury to tissue. Nociceptive pain is typically responsive to common pain medication, such as opioids.

The term "analgesia" is used herein to describe states of reduced pain perception, including absence from pain sensations, as well as states of reduced or absent sensitivity to noxious stimuli. Such states of reduced or absent pain perception are typically induced by the administration of a pain-controlling agent or agents and occur without loss of consciousness, as is commonly understood in the art. Suitable methods for determining whether a compound is capable of providing an analgesic effect will be familiar to persons skilled in the art, illustrative examples of which include the use of animal models of neuropathic pain, such as chronic constriction injury, spinal nerve ligation and partial sciatic nerve ligation (see Bennett et al. (2003); *Curr.* *Protoc. Neurosci.*, Chapter 9, Unit 9.14) and animal models of nociceptive pain, such as formalin-, carrageenan- or complete Freund's adjuvant (CFA)-induced inflammatory pain. Other suitable models of pain are discussed in Gregory et al. (2013, *J. Pain.;* 14(11); ": *An overview of animal models of pain: disease models and outcome measures*").

As persons skilled in the art will know, there are many possible causes of neuropathy and neuropathic pain. It is therefore to be understood that contemplated herein is the treatment or prevention of neuropathic pain regardless of cause. In some embodiments, neuropathic pain is a result of a disease or condition affecting the nerves (primary neuropathy) and/or neuropathy that is caused by systemic disease (secondary neuropathy), illustrative examples of which include diabetic neuropathy; Herpes Zoster (shingles)-related neuropathy; fibromyalgia; multiple sclerosis, stroke, spinal cord injury; chronic post-surgical pain, phantom limb pain, Parkinson's disease; uremia-associated neuropathy; amyloidosis neuropathy; HIV sensory neuropathies; hereditary motor and sensory neuropathies (HMSN); hereditary sensory neuropathies (HSNs); hereditary sensory and autonomic neuropathies; hereditary neuropathies with ulcero-mutilation; nitrofurantoin neuropathy; tomaculous neuropathy; neuropathy caused by nutritional deficiency, neuropathy caused by kidney failure and complex regional pain syndrome. Other illustrative examples of conditions that may cause neuropathic pain include repetitive activities such as typing or working on an assembly line, medications known to cause peripheral neuropathy such as several anti-retroviral drugs ddC (zalcitabine) and ddI (didanosine), antibiotics (metronidazole, an antibiotic used for Crohn's disease, isoniazid used for tuberculosis), gold compounds (used for rheumatoid arthritis), some chemotherapy drugs (such as vincristine and others) and many others. Chemical compounds are also known to cause peripheral neuropathy including alcohol, lead, arsenic, mercury and organophosphate pesticides. Some peripheral neuropathies are associated with infectious processes (such as Guillain-Barré syndrome). Other illustrative examples of neuropathic pain include thermal or mechanical hyperalgesia, thermal or mechanical allodynia, diabetic pain, neuropathic pain affecting the oral cavity (e.g., trigeminal neuropathic pain, atypical odontalgia (phantom tooth pain), burning mouth syndrome), fibromyalgia and entrapment pain.

In an embodiment disclosed herein, the neuropathic pain is selected from the group consisting of diabetic neuropathy; Herpes Zoster (shingles)-related neuropathy; fibromyalgia; multiple sclerosis, stroke, spinal cord injury; chronic post-surgical pain, phantom limb pain, Parkinson's disease; uremia-associated neuropathy; amyloidosis neuropathy; HIV sensory neuropathy; hereditary motor and sensory neuropathy (HMSN); hereditary sensory neuropathy (HSN); hereditary sensory and autonomic neuropathy; hereditary neuropathy with ulcero-mutilation; nitrofurantoin neuropathy; tomaculous neuropathy; neuropathy caused by nutritional deficiency, neuropathy caused by kidney failure, trigeminal neuropathic pain, atypical odontalgia (phantom tooth pain), burning mouth syndrome, complex regional pain syndrome, repetitive strain injury, drug-induced peripheral neuropathy. peripheral neuropathy associated with infection, allodynia, hyperesthesia, hyperalgesia, burning pain and shooting pain.

In some embodiments, the neuropathic pain may be accompanied by numbness, weakness and loss of reflexes. The pain may be severe and disabling. By "hyperalgesia" is meant an increased response to a stimulus that is normally painful. A hyperalgesia condition is one that is associated with pain caused by a stimulus that is not normally painful.

The term "hyperesthesia" refers to an excessive physical sensitivity, especially of the skin. The term "allodynia" as used herein refers to the pain that results from a non-noxious stimulus; that is, pain due to a stimulus that does not normally provoke pain. Illustrative examples of allodynia include thermal allodynia (pain due to a cold or hot stimulus), tactile allodynia (pain due to light pressure or touch), mechanical allodynia (pain due to heavy pressure or pinprick) and the like.

Neuropathic pain may be acute or chronic and, in this context, it is to be understood that the time course of a neuropathy may vary, based on its underlying cause. For instance, with trauma, the onset of neuropathic pain or symptoms of neuropathic pain may be acute, or sudden; however, the most severe symptoms may develop over time and persist for years. A chronic time course over weeks to months usually indicates a toxic or metabolic neuropathy. A chronic, slowly progressive neuropathy, such as occurs with painful diabetic neuropathy or with most hereditary neuropathies or with a condition termed chronic inflammatory demyelinating polyradiculoneuropathy (CIDP), may have a time course over many years. Neuropathic conditions with symptoms that relapse and remit include Guillain-Barré syndrome.

In some embodiments, neuropathic pain results from a condition characterised by neuronal hypersensitivity, such as fibromyalgia or irritable bowel syndrome.

In other embodiments, neuropathic pain results from a disorder associate with aberrant nerve regeneration resulting in neuronal hypersensitivity. Such disorders include breast pain, interstitial cystitis, vulvodynia and cancer chemotherapy-induced neuropathy.

In some embodiments, the neuropathic pain is related to surgery, pre-operative pain and post-operative pain, particularly post-operative neuropathic pain.

Microbial Infection

Microbial infection by pathogens such as bacteria, viruses and fungi, remain a major global health problem with significant socioeconomic costs. Whilst treatment of bacterial infections largely relies on antibiotics, the standard approach to viral infection remains supportive care and placating symptoms. Whilst such treatments have shown some efficacy, emerging and re-emerging pathogens continue to plague humans and non-human populations, attributed at least in part to mutations that give rise to new strains with enhanced infectivity and/or resistance to existing pharmacological intervention. The lack of timely available antiviral agents, including vaccines, has also made it difficult to contain viral outbreaks globally.

There are over 200 known serological strains of virus that cause infection, including respiratory tract infection, the most common of which include rhinoviruses (30-50%). Others include coronaviruses (10-15%), influenza (5-15%), human parainfluenza viruses, human respiratory syncytial virus, adenoviruses, enteroviruses, and metapneumovirus. While over 30 coronaviruses have been identified, only 3 or 4 are known to cause respiratory tract infection in humans. Moreover, coronaviruses are typically difficult to culture in vitro, making it difficult to study their function and develop suitable therapies. Coronaviruses are enveloped, positive-stranded RNA viruses that bud from the endoplasmic reticulum-Golgi intermediate compartment or the cis-Golgi network. Coronaviruses infect humans and animals. The human coronaviruses, 229E, OC43 and the more recently identified severe acute respiratory syndrome coronavirus 2 (SARS-COV-2; see Zhu N et al., *N Engl J Med.* 2020), are known to be the major causes of respiratory tract infection and can cause pneumonia, in particular in older adults, neonates and immunocompromised individuals. Illustrative examples of coronaviruses that lead to respiratory tract infection are described in US patent publication no. 20190389816, the contents of which are incorporated herein by reference in their entirety.

Another pervasive viral infection is caused by human rhinovirus (HRV), which is a member of the Enterovirus genus in the Picornaviridae family. HRV can infect the upper and lower respiratory tract, including the nasal mucosa, sinuses and middle ear, with infections producing symptoms of the common cold. Infections are typically self-limiting and restricted to the upper airways.

Some viral infections are also asymptomatic in one person but infectious in another. In these cases, transmission of the virus can be widespread as the infected person does not appear ill. Transmission is particularly detrimental in schools, hospitals, nursing homes and others with susceptible populations living in close quarters.

There are currently very few approved antiviral agents for the treatment or prevention of viral infections of the respiratory tract, including the flu or the common cold. These include oseltamivir phosphate (trade name Tamiflu®), zanamivir (trade name Relenza®), peramivir (trade name Rapivab®) and baloxavir marboxil (trade name Xofluza®). Treatment of respiratory tract infections are typically based on management of symptoms (e.g., sneezing, nasal congestion, rhinorrhea, eye irritation, sore throat, cough, headaches, fever, chills), typically with over the counter oral antihistamines, aspirin, cough suppressants, and nasal decongestants. Symptomatic treatment usually involves taking anti-histamines and/or vasoconstrictive decongestants, many of which have undesirable side-effects such a drowsiness.

Without being bound by theory or by a particular mode of application, the present inventors have surprisingly found that the peptides described herein can be used to treat microbial infection, including to alleviate at least some of the symptoms of infection, such as respiratory tract infection.

Respiratory tract infection (RTI) is typically defined as any infectious disease of the upper or lower respiratory tract. Upper respiratory tract infections (URTIs) include the common cold, laryngitis, pharyngitis/tonsillitis, acute rhinitis, acute rhinosinusitis and acute otitis media. Lower respiratory tract infections (LRTIs) include acute bronchitis, bronchiolitis, pneumonia and tracheitis. Antibiotics are commonly prescribed for RTIs in adults and children in primary care. RTIs are the reason for 60% of all antibiotic prescribing in general practice, and this constitutes a significant cost to the health system (*NICE Clinical Guidelines, No. 69*; Centre for Clinical Practice at NICE (UK), London: National Institute for Health and Clinical Excellence (UK); 2008).

Pathogens that give rise to infection of the upper and/or lower respiratory tracts in human and non-human subjects will be known to persons skilled in the art, and include bacteria and viruses, illustrative examples of which are described in Charlton et al. (*Clinical Microbiology Reviews;* 2018, 32 (1): e00042-18), Popescu et al. (*Microorganisms.* 2019; 7(11): 521) and Kikkert, M. (*J Innate Immun.* 2020; 12(1): 4-20), the contents of which are incorporated herein by reference in their entirety. In an embodiment, the respiratory tract infection is a virus infection.

Viruses that give rise to infection of the respiratory tract in human and non-human subjects (upper and/or lower respiratory tracts) will be known to persons skilled in the art, illustrative examples of which include a picornavirus, a coronavirus, an influenza virus, a parainfluenza virus, a respiratory syncytial virus, an adenovirus, an enterovirus, and a metapneumovirus. Thus, in an embodiment disclosed herein, the virus is selected from the group consisting of a picornavirus, a coronavirus, an influenza virus, a parainfluenza virus, a respiratory syncytial virus, an adenovirus, an enterovirus, and a metapneumovirus. In an embodiment, the virus is an influenza virus. In another embodiment, the virus is a coronavirus. Illustrative examples of coronaviruses that give rise to respiratory tract infection will be familiar to persons skilled in the art, illustrative examples of which include SARS-COV-2 as previously described in Zhu N et al., (N Engl J Med. 2020) and in US patent publication no. 20190389816, the contents of which are incorporated herein by reference in their entirety. In an embodiment, the virus is SARS-COV-2.

The peptides described herein may be particularly useful for treating respiratory tract infection in subjects with an underlying medical condition that would otherwise exacerbate the respiratory tract infection. Such underlying conditions will be known to persons skilled in the art, illustrative examples of which include chronic obstructive pulmonary disease, asthma, cystic fibrosis, emphysema and lung cancer. In an embodiment, the subject has a further respiratory condition selected from the group consisting of chronic obstructive pulmonary disease, asthma, cystic fibrosis and lung cancer. In another embodiment, the subject is immunocompromised, whether as a result of treatment (e.g., by chemotherapy, radiotherapy) or otherwise (e.g., by HIV infection).

Viral replication of viruses in humans typically begins 2 to 6 hours after initial contact. In some cases, the patient is infectious for a couple of days before the onset of symptoms. Symptoms usually begin about 2 to 5 days after initial infection. Respiratory tract infection such as the common cold is most infectious during the first two to three days of symptoms. There is currently no known treatment that shortens the duration of a cold, although symptoms usually resolve spontaneously in about 7 to 10 days, with some symptoms possibly lasting for up to three weeks. The virus may still be infectious until symptoms have completely resolved.

As noted elsewhere herein, the present inventors have also found that the peptides described herein are surprisingly effective at limiting viral replication in vivo and reducing hyper-inflammation and severe disease during IAV infection.

Inflammatory Airway Disease

In embodiment disclosed herein, the condition is an inflammatory airway disease. Inflammatory airway diseases, such as chronic obstructive pulmonary disease (COPD), asthma, chronic bronchitis, emphysema, cystic fibrosis, lung cancer and bronchopulmonary dysplasia, are among the world's most prevalent diseases. The prevalence of asthma, in particular, has increased over the past 20 years and currently affects up to 10% of the populations in most developed countries. COPD is the sixth most common cause of death in the world and is said to affect around 4-6% of people of 45 years of age or more. It is beyond contestation that inflammatory airway diseases constitute a major financial burden to society, having regard to both direct and indirect costs.

Asthma and COPD are identified by the presence of characteristic symptoms and functional abnormalities, with airway obstruction being the sine qua non of both diseases. The airway obstruction in asthma is typically reversible, whereas COPD is typically characterized by abnormal expiratory flow that does not change markedly over periods of several months of observation. Both airway diseases are associated with lung inflammation induced by different initiating factors, examples of which include environmental allergens and carcinogens, occupational sensitizing agents, cigarette smoke, asbestos and silica. It is to be noted, however, that some patients with asthma who do not smoke will also develop irreversible airway obstruction similar to COPD.

Chronic obstructive pulmonary disease is a growing healthcare problem that is expected to worsen as the population ages and the worldwide use of tobacco products increases. Smoking cessation is the only effective means of prevention. Employers are in a unique position to help employees stop smoking. During the long asymptomatic phase, lung function nevertheless continues to decline; therefore, many patients seek medical attention only when they are at an advanced stage or when they have experienced an acute exacerbation. To help preserve patients' quality of life and reduce healthcare costs related to this chronic disease, clinicians need to accurately diagnose the condition and appropriately manage patients through the long course of their illness.

As noted by Devine, FJ (2008; Am Health Drug Benefits; 1(7):34-42), COPD is a poorly reversible disease of the lungs that is one of the major causes of morbidity and mortality worldwide. Contrary to the trends for other major chronic diseases in the United States, the prevalence of and mortality from COPD have continued to rise, with death rates having doubled between 1970 and 2002, and mortality figures for women having now surpassed those for men. Given that the majority of COPD cases are caused by smoking, it is primarily a preventable disease. Most patients with COPD are middle-aged or elderly. Effective treatments for COPD have largely been elusive. The only strategy known to reduce the incidence of the disease is smoking cessation.

Asthma is a heterogeneous, multifactorial disease with variable and mostly reversible respiratory pathway obstruction based on a chronic bronchial inflammatory reaction (Horak et al., 2016; Wien Klin Wochenschr. 128(15):541-554). Symptoms of asthma (cough, phlegm, rhonchus, wheezing, chest tightness, or shortness of breath) are variable and typically correlated with expiratory flow limitation. Owing to its heterogeneity, a number of different phenotypes can be ascribed to asthma and include: allergic asthma, non-allergic asthma, pediatric asthma/recurrent obstructive bronchitis, late-onset asthma, asthma with fixed airflow obstruction, obesity-related asthma, occupational asthma, asthma in the elderly and severe asthma.

Treatment for asthma (pharmacological and non-pharmacological intervention) is largely based on symptom control—a cycle of assess, adjust, and review—and is usually associated with reduced asthma exacerbations. From a pharmacological perspective, the gold standard in asthma therapy is typically low-dose inhaled corticosteroids, often in combination with an on-demand short-acting beta-2-agonist (SABA). Other treatments include LTRA (leucotriene-receptor antagonists), combinations of low-dose inhaled corticosteroids and long-acting beta-2-agonist (LABA). However, existing treatments have the potential to cause side effects, in particular during long-term use. Common side effects of preventative medication (e.g., inhaled corticosteroids) are a hoarse voice, sore mouth and throat, and fungal infections of the throat.

The present inventors have surprisingly found that the peptides described herein can alleviate at least some of the inflammatory mediators of an inflammatory airway disease.

Inflammatory airway diseases will be familiar to persons skilled in the art, illustrative examples of which include chronic obstructive pulmonary disease (COPD), asthma, chronic bronchitis, emphysema, cystic fibrosis, lung cancer and bronchopulmonary dysplasia. In an embodiment, the inflammatory airway disease is COPD. In an embodiment, the inflammatory airway disease is asthma. In an embodiment, the inflammatory airway disease is chronic bronchitis. In an embodiment, the inflammatory airway disease is emphysema. In an embodiment, the inflammatory airway disease is cystic fibrosis. In an embodiment, the inflammatory airway disease is associated with lung cancer. In an embodiment, the inflammatory airway disease is bronchopulmonary dysplasia.

The methods described herein may be particularly useful for treating an inflammatory airway disease in a subject that is susceptible to a condition that would otherwise exacerbate the inflammatory airway disease. Such underlying conditions will be known to persons skilled in the art, illustrative examples of which include respiratory infection by, e.g., viruses, bacteria or other pathogens. In another embodiment, the subject is immunocompromised, whether as a result of treatment (e.g., by chemotherapy, radiotherapy) or otherwise (e.g., by HIV infection).

Routes of Administration

The peptides and pharmaceutically acceptable salts thereof, as described herein, may be administered to the subject by any suitable route that allows for delivery of the peptides or pharmaceutically acceptable salts thereof to the subject at a therapeutically effective amount, as herein described. Suitable routes of administration will be known to persons skilled in the art, illustrative examples of which include enteral routes of administration (e.g., oral and rectal), parenteral routes of administration, typically by injection or microinjection (e.g., intramuscular, subcutaneous, intravenous, epidural, intra-articular, intraperitoneal, intracisternal or intrathecal) and topical (transdermal or transmucosal) routes of administration (e.g., buccal, sublingual, vaginal, intranasal or by inhalation, insufflation, suppository or nebulization). In an embodiment, the route of administration is by inhalation or insufflation. The peptides and pharmaceutically acceptable salts thereof, as described herein, may also suitably be administered to the subject as a controlled release dosage form to provide a controlled release of the active agent(s) over an extended period of time. The term "controlled release" typically means the release of the active agent(s) to provide a constant, or substantially constant, concentration of the active agent in the subject over a period of time (e.g., about eight hours up to about 12 hours, up to about 14 hours, up to about 16 hours, up to about 18 hours, up to about 20 hours, up to a day, up to a week, up to a month, or more than a month). Controlled release of the active agent(s) can begin within a few minutes after administration or after expiration of a delay period (lag time) after administration, as may be required. Suitable controlled release dosage forms will be known to persons skilled in the art, illustrative examples of which are described in Anal, A. K. (2010; *Controlled-Release Dosage Forms*. Pharmaceutical Sciences Encyclopedia. 11:1-46).

Without being bound by theory or by a particular mode of application, it may be desirable to elect a route of administration on the basis of the severity of the disease, condition or one or more symptoms thereof, as described herein. In an embodiment disclosed herein, the peptides or pharmaceutically acceptable salts thereof, as described herein, are administered to the subject enterally. In an embodiment disclosed herein, the peptides or pharmaceutically acceptable salts thereof, as described herein, are administered to the subject orally. In an embodiment disclosed herein, the peptides or pharmaceutically acceptable salts thereof, as described herein, are administered to the subject parenterally. In another embodiment disclosed herein, the peptides or pharmaceutically acceptable salts thereof, as described herein, are administered to the subject topically. In another embodiment disclosed herein, the peptides or pharmaceutically acceptable salts thereof, as described herein, are administered to the subject by inhalation. In another embodiment disclosed herein, the peptides or pharmaceutically acceptable salts thereof, as described herein, are administered to the subject by insufflation.

As described elsewhere herein, "topical" administration typically means application of the active agents to a surface of the body, such as the skin or mucous membranes, suitably in the form of a cream, lotion, foam, gel, ointment, nasal drop, eye drop, ear drop, transdermal patch, transdermal film (e.g., sublingual film) and the like. Topical administration also encompasses administration via the mucosal membrane of the respiratory tract by inhalation or insufflation. In an embodiment disclosed herein, the topical administration is selected from the group consisting of transdermal and transmucosal administration. In an embodiment, the peptides or pharmaceutically acceptable salts thereof, as described herein, are administered to the subject transdermally. In an embodiment, the peptides or pharmaceutically acceptable salts thereof, as described herein, are administered to the subject by inhalation, insufflation or nebulization.

In an embodiment, the methods comprise administering the peptides or pharmaceutically acceptable salts thereof, as described herein, to a human by inhalation or insufflation. In another embodiment, the methods comprise administering the peptides or pharmaceutically acceptable salts thereof, as described herein, to a non-human subject by inhalation or insufflation. In yet another embodiment, the methods comprise administering the peptides or pharmaceutically acceptable salts thereof, as described herein, to a non-human subject selected from the group consisting of a feline, a canine and an equine.

In an embodiment, the methods comprise administering the peptides or pharmaceutically acceptable salts thereof, as described herein, orally to a human. In another embodiment, the methods comprise administering the peptides or pharmaceutically acceptable salts thereof, as described herein, orally to a non-human subject. In yet another embodiment, the methods comprise administering the peptides or pharmaceutically acceptable salts thereof, as described herein, orally to a non-human subject selected from the group consisting of a feline, a canine and an equine.

Illustrative examples of topical administration are described elsewhere herein. In an embodiment, the topical administration is transdermal.

In an embodiment disclosed herein, the peptides or pharmaceutically acceptable salts thereof, as described herein, are administered to the subject as a controlled release dosage form, illustrative examples of which are described elsewhere herein. In an embodiment, the methods comprise administering the peptides or pharmaceutically acceptable salts thereof, as described herein, to a human as a controlled release dosage form. In another embodiment, the methods comprise administering the peptides or pharmaceutically acceptable salts thereof, as described herein, to a non-human subject as a controlled release dosage form. In yet another embodiment, the methods comprise administering the peptides or pharmaceutically acceptable salts thereof, as described herein, as a controlled release dosage form to a non-human subject selected from the group consisting of a feline, a canine and an equine.

As noted elsewhere herein, several (i.e., multiple) divided doses may be administered daily, weekly, monthly or other suitable time intervals, or the dose may be proportionally reduced as indicated by the exigencies of the situation. Where a course of multiple doses is required or otherwise desired, it may be beneficial to administer the peptides, as herein disclosed, via more than one route. For example, it may be desirable to administer a first dose parenterally (e.g., via intramuscular, intravenous; subcutaneous, epidural, intra-articular, intraperitoneal, intracisternal or intrathecal routes of administration) to induce a rapid or acute therapeutic effect in a subject, followed by a subsequent (e.g., second, third, fourth, fifth, etc) dose administered enterally (e.g., orally or rectally), by inhalation or insufflation and/or topically (e.g., via transdermal or transmucosal routes of administration) to provide continuing availability of the active agent over an extended period subsequent to the acute phase of treatment. Alternatively, it may be desirable to administer a dose enterally (e.g., orally or rectally), followed by a subsequent (e.g., second, third, fourth, fifth, etc) dose administered parenterally (e.g., via intramuscular, intravenous; subcutaneous, epidural, intra-articular, intraperitoneal, intracisternal or intrathecal routes of administration), by inhalation or insufflation and/or topically (e.g., via transdermal or transmucosal routes of administration). Alternatively, it may be desirable to administer a dose topically (e.g., via transdermal or transmucosal routes of administration), followed by a subsequent (e.g., second, third, fourth, fifth, etc) dose administered parenterally (e.g., via intramuscular, intravenous; subcutaneous, epidural, intra-articular, intraperitoneal, intracisternal or intrathecal routes of administration), by inhalation or insufflation and/or enterally (e.g., orally or rectally).

It is also to be understood that, where multiple routes of administration are desired, any combination of two or more routes of administration may be used in accordance with the methods disclosed herein. Illustrative examples of suitable combinations include, but are not limited to, (in order of administration), (a) parenteral-enteral; (b) parenteral-topical; (c) parenteral-enteral-topical; (d) parenteral-topical-enteral; (e) enteral-parenteral; (f) enteral-topical; (g) enteral-topical-parenteral; (h) enteral-parenteral-topical; (i) topical-parenteral; (j) topical-enteral; (k) topical-parenteral-enteral; (l) topical-enteral-parenteral; (m) parenteral-enteral-topical-parenteral; (n) parenteral-enteral-topical-enteral; etc.

Pharmaceutical Compositions

The peptides or pharmaceutically acceptable salts thereof, as described herein, may be formulated for administration to a subject as a neat chemical. However, in certain embodiments, it may be preferable to formulate the peptide or a pharmaceutically acceptable salt thereof, as described herein, as a pharmaceutical composition, including veterinary compositions. Thus, in another aspect disclosed herein, there is provided a peptide as described herein for use in treating a condition in a subject in need thereof, as described herein.

As noted elsewhere herein, the peptides and pharmaceutically acceptable salts thereof, as described herein, may be administered together, either sequentially or in combination (e.g., as an admixture), with one or more other active agents appropriate to the underlying condition to be treated. For example, the compositions disclosed herein may be formulated for administration together, either sequentially or in combination (e.g., as an admixture), with an inhaled corticosteroid typically employed for the treatment of asthma. Other suitable combination or adjunct therapies will be familiar to persons skilled in the art, the choice of which will depend on the underlying condition or symptom thereof.

In an embodiment, the composition further comprises a pharmaceutically acceptable carrier, excipient or diluent, as described elsewhere herein.

The peptides and pharmaceutically acceptable salts thereof, as described herein, may suitably be prepared as pharmaceutical compositions and unit dosage forms to be employed as solids (e.g., tablets or filled capsules) or liquids (e.g., solutions, suspensions, emulsions, elixirs, or capsules filled with the same) for oral use, in the form of ointments, suppositories or enemas for rectal administration, in the form of sterile injectable solutions for parenteral use (e.g., intramuscular, subcutaneous, intravenous, epidural, intra-articular and intrathecal administration); or in the form of ointments, lotions, creams, gels, patches, sublingual strips or films, and the like for parenteral (e.g., topical, buccal, sublingual, vaginal) administration. In an embodiment, the peptides and pharmaceutically acceptable salts thereof, as described herein, are formulated for topical (e.g., transdermal) delivery. Suitable transdermal delivery systems will be familiar to persons skilled in the art, illustrative examples of which are described by Prausnitz and Langer (2008; *Nature Biotechnol.* 26(11):1261-1268), the contents of which are incorporated herein by reference. In another embodiment, the peptides and pharmaceutically acceptable salts thereof, as described herein, are formulated for sublingual or buccal delivery. Suitable sublingual and buccal delivery systems will be familiar to persons skilled in the art, illustrative examples of which include dissolvable strips or films, as described by Bala et al. (2013; *Int. J. Pharm. Investig.* 3(2):67-76), the contents of which are incorporated herein by reference.

Suitable pharmaceutical compositions and unit dosage forms thereof may comprise conventional ingredients in conventional proportions, with or without additional active compounds or principles, and such unit dosage forms may contain any suitable effective amount of the active ingredient commensurate with the intended daily dosage range to be employed. The peptides and pharmaceutically acceptable salts thereof, as described herein, can be formulated for administration in a wide variety of enteral, topical and/or parenteral dosage forms. Suitable dosage forms may comprise, as the active component, a combination of two or more of the peptides or pharmaceutically acceptable salts thereof, described herein.

In an embodiment, the composition is formulated for oral administration to a human. In another embodiment, the composition is formulated for oral administration to a non-human subject. In yet another embodiment, the composition is formulated for oral administration to a non-human subject selected from the group consisting of a feline, a canine and an equine.

In another embodiment, the composition is formulated for parenteral administration to a human. In another embodiment, the composition is formulated for parenteral administration to a non-human subject. In yet another embodiment, the composition is formulated for parenteral administration to a non-human subject selected from the group consisting of a feline, a canine and an equine. In an embodiment, the parenteral administration is subcutaneous administration.

In another embodiment, the composition is formulated for topical administration to a human. In another embodiment, the composition is formulated for topical administration to a non-human subject. In yet another embodiment, the composition is formulated for topical administration to a non-human subject selected from the group consisting of a feline, a canine and an equine. In an embodiment, the topical administration is transdermal.

In another embodiment, the composition is formulated for administration to a human by inhalation or insufflation. In another embodiment, the composition is formulated for administration to a non-human subject by inhalation or insufflation. In yet another embodiment, the composition is formulated for administration by inhalation or insufflation to a non-human subject selected from the group consisting of a feline, a canine and an equine.

In another embodiment, the composition is formulated as a controlled release dosage form to be administered to a human. In another embodiment, the composition is formulated as a controlled release dosage form to be administered to a non-human subject. In yet another embodiment, the composition is formulated as a controlled release dosage form to be administered to a non-human subject selected from the group consisting of a feline, a canine and an equine. Illustrative examples of suitable controlled release dosage forms are described elsewhere herein.

For preparing the pharmaceutical compositions described herein, pharmaceutically acceptable carriers can be either solid or liquid. Illustrative examples of solid form preparations include powders, tablets, pills, capsules, cachets, suppositories, and dispersible granules. A solid carrier can be one or more substances which may also act as diluents, flavouring agents, solubilizers, lubricants, suspending agents, binders, preservatives, tablet disintegrating agents, or an encapsulating material. In powders, the carrier may be a finely divided solid which is in a mixture with the finely divided active component. In tablets, the active component may be mixed with the carrier having the necessary binding capacity in suitable proportions and compacted in the shape and size desired.

In some embodiments, the powders and tablets contain from five or ten to about seventy percent of the active compound. Illustrative examples of suitable carriers include magnesium carbonate, magnesium stearate, talc, sugar, lactose, pectin, dextrin, starch, gelatin, tragacanth, methylcellulose, sodium carboxymethylcellulose, a low melting wax, cocoa butter, and the like. The term "preparation" is intended to include the formulation of the active compound with encapsulating material, providing a capsule in which the active component, with or without carriers, is surrounded by a carrier. Similarly, cachets and lozenges are also envisaged herein. Tablets, powders, capsules, pills, cachets, and lozenges can be used as solid forms suitable for oral administration.

For preparing suppositories, a low melting wax, such as admixture of fatty acid glycerides or cocoa butter, is first melted and the active component is dispersed homogeneously therein, as by stirring. The molten homogenous mixture is then poured into convenient sized molds, allowed to cool, and thereby to solidify.

Formulations suitable for vaginal administration may be presented as pessaries, tampons, creams, gels, pastes, foams or sprays containing in addition to the active ingredient such carriers as are known in the art to be appropriate.

Liquid form preparations include solutions, suspensions, and emulsions, for example, water or water-propylene glycol solutions. For example, parenteral injection liquid preparations can be formulated as solutions in aqueous polyethylene glycol solution.

The peptides and pharmaceutically acceptable salts thereof, as described herein, may be formulated for parenteral administration (e.g. by injection, for example bolus injection or continuous infusion) and may be presented in unit dose form in ampoules, pre-filled syringes, small volume infusion or in multi-dose containers with an added preservative. The compositions may take such forms as suspensions, solutions, or emulsions in oily or aqueous vehicles, and may contain formulatory agents such as suspending, stabilizing and/or dispersing agents. Alternatively, the active compound(s) may be in powder form, obtained by aseptic isolation of sterile solid or by lyophilization from solution, for constitution with a suitable vehicle, e.g. sterile, pyrogen-free water, before use.

Aqueous solutions suitable for oral use can be prepared by dissolving the active component in water and adding suitable colorants, flavours, stabilizing and thickening agents, as desired.

Aqueous suspensions suitable for oral use can be made by dispersing the finely divided active component in water with viscous material, such as natural or synthetic gums, resins, methylcellulose, sodium carboxymethylcellulose, or other well known suspending agents.

Also contemplated herein are solid form preparations which are intended to be converted, shortly before use, to liquid form preparations for oral administration. Such liquid forms include solutions, suspensions, and emulsions. These preparations may contain, in addition to the active component, colorants, flavours, stabilizers, buffers, artificial and natural sweeteners, dispersants, thickeners, solubilizing agents, and the like.

For topical administration to the epidermis, the peptides and pharmaceutically acceptable salts thereof, as described herein, may be formulated as ointments, creams or lotions, or as a transdermal patch. Ointments and creams may, for example, be formulated with an aqueous or oily base with the addition of suitable thickening and/or gelling agents. Lotions may be formulated with an aqueous or oily base and will in general also contain one or more emulsifying agents, stabilizing agents, dispersing agents, suspending agents, thickening agents, or colouring agents.

Formulations suitable for topical administration in the mouth include lozenges comprising active agent in a flavoured base, usually sucrose and acacia or tragacanth; pastilles comprising the active ingredient in an inert base such as gelatin and glycerin or sucrose and acacia; and mouthwashes comprising the active ingredient in a suitable liquid carrier.

Solutions or suspensions are applied directly to the nasal cavity by conventional means, for example with a dropper, pipette or spray. The formulations may be provided in single or multidose form. In the latter case of a dropper or pipette, this may be achieved by the patient administering an appropriate, predetermined volume of the solution or suspension. In the case of a spray, this may be achieved for example by means of a metering atomizing spray pump or inhaler. To improve nasal delivery and retention the peptides used in the invention may be encapsulated with cyclodextrins, or formulated with their agents expected to enhance delivery and retention in the nasal mucosa.

Administration to the airways may also be achieved by means of an aerosol formulation in which the active ingredient is provided in a pressurised pack with a suitable propellant such as a chlorofluorocarbon (CFC) for example, dichlorodifluoromethane, trichlorofluoromethane, or dichlorotetrafluoroethane, carbon dioxide, or other suitable gas. The aerosol may conveniently also contain a surfactant such as lecithin. The dose of drug may be controlled by provision of a metered valve.

Alternatively, or in addition, the active ingredients may be provided in the form of a dry powder, for example a powder mix of the compound in a suitable powder base such as lactose, starch, starch derivatives such as hydroxypropylmethyl cellulose and polyvinylpyrrolidone (PVP). Conveniently, the powder carrier will form a gel in the nasal cavity. The powder composition may be presented in unit dose form for example in capsules or cartridges of, e.g., gelatin, or blister packs from which the powder may be administered by means of an inhaler.

In formulations intended for administration to the airways, including intranasal formulations, the peptide will generally have a small particle size for example of the order of 1 to 10 microns or less. Such a particle size may be obtained by means known in the art, for example by micronization.

When desired, formulations adapted to give controlled or sustained release of the active ingredient may be employed, as described elsewhere herein.

In an embodiment, the pharmaceutical preparations, as herein described, are preferably in unit dosage forms. In such form, the preparation is subdivided into unit doses containing appropriate quantities of the active component. The unit dosage form can be a packaged preparation, the package containing discrete quantities of preparation, such as packeted tablets, capsules, and powders in vials or ampoules. Also, the unit dosage form can be a capsule, tablet, cachet, or lozenge itself, or it can be the appropriate number of any of these in packaged form.

In an embodiment, the compositions disclosed herein are formulated for oral administration to a human. In yet another embodiment, the compositions disclosed herein are formulated for oral administration to a non-human. In a further embodiment, the compositions disclosed herein are formulated for oral administration to a non-human selected from the group consisting of a feline, a canine and an equine.

In an embodiment, the compositions disclosed herein are formulated for administration to a human by inhalation or insufflation. In yet another embodiment, the compositions disclosed herein are formulated for administration to a non-human by inhalation or insufflation. In a further embodiment, the compositions disclosed herein are formulated for administration by inhalation or insufflation to a non-human selected from the group consisting of a feline, a canine and an equine.

In another embodiment, the peptides and pharmaceutically acceptable salts thereof, as described herein, are formulated for oral administration to a human subject. In another embodiment, the peptides and pharmaceutically acceptable salts thereof, as described herein, are formulated for oral administration to a non-human subject. In yet another embodiment, the peptides and pharmaceutically acceptable salts thereof, as described herein, are formulated for oral administration to a non-human subject selected from the group consisting of a feline, a canine and an equine.

In another embodiment, the peptides and pharmaceutically acceptable salts thereof, as described herein, are formulated for topical administration to a human subject. In yet another embodiment, the peptides and pharmaceutically acceptable salts thereof, as described herein, are formulated for topical administration to a non-human subject. In another embodiment, the peptides and pharmaceutically acceptable salts thereof, as described herein, are formulated for topical administration to a non-human subject selected from the group consisting of a feline, a canine and an equine. In an embodiment, the topical administration is transdermal.

In another embodiment, the peptides and pharmaceutically acceptable salts thereof, as described herein, are formulated for administration to a human subject by inhalation or insufflation. In yet another embodiment, the peptides and pharmaceutically acceptable salts thereof, as described herein, are formulated for administration to a non-human subject by inhalation or insufflation. In another embodiment, the peptides and pharmaceutically acceptable salts thereof, as described herein, are formulated for administration by inhalation or insufflation to a non-human subject selected from the group consisting of a feline, a canine and an equine.

In another embodiment, the peptides and pharmaceutically acceptable salts thereof, as described herein, are formulated for administration to a human subject as a controlled release dosage form. In yet another embodiment, the peptides and pharmaceutically acceptable salts thereof, as described herein, are formulated for administration to a non-human subject as a controlled release dosage form. In another embodiment, the peptides and pharmaceutically acceptable salts thereof, as described herein, are formulated for administration to a non-human subject as a controlled release dosage form, wherein the non-human subject is selected from the group consisting of a feline, a canine and an equine. In an embodiment, the controlled release dosage form is formulated for parenteral administration.

As noted elsewhere herein, several (i.e., multiple) divided doses may be administered daily, weekly, monthly or other suitable time intervals, or the dose may be proportionally reduced as indicated by the exigencies of the situation. Where a course of multiple doses is required or otherwise desired, the compositions disclosed herein can be suitably formulated for administration via said multiple routes. For example, it may be desirable to administer a first dose parenterally (e.g., intramuscular, intravenously; subcutaneously, etc.) to induce a rapid or otherwise acute therapeutic effect in a subject, followed by a subsequent (e.g., second, third, fourth, fifth, etc.) dose administered non-parenterally (e.g., enterally and/or topically) to provide continuing availability of the active agent over an extended period subsequent to the acute phase of treatment. Thus, in an embodiment, the peptides and compositions, as disclosed herein, are formulated for parenteral administration to the subject as a first dose (i.e., as a parenteral dosage form) and formulated for non-parenteral administration to the subject after the first dose (e.g., as an enteral and/or topical dosage form). In an embodiment, the parental administration is selected from the group consisting of intramuscular, subcutaneous and intravenous. In a further embodiment, the parental administration is subcutaneous.

In another embodiment, the enteral administration is oral administration. Thus, in an embodiment, the peptides and compositions, as disclosed herein, are formulated for parenteral administration to the subject as a first dose and formulated for oral administration to the subject after the first dose (i.e., as an oral dosage form).

In another embodiment, the enteral administration is topical administration. Thus, in an embodiment, the peptides and compositions, as disclosed herein, are formulated for parenteral administration to the subject as a first dose and formulated for topical administration to the subject after the first dose (i.e., as an oral dosage form). In an embodiment, the topical administration is transdermal administration.

In another embodiment, it may be desirable to administer a first dose parenterally (e.g., intramuscular, intravenously; subcutaneously, etc.) to induce a rapid or otherwise acute therapeutic effect in a subject, followed by a subsequent (e.g., second, third, fourth, fifth, etc.) administration of a controlled release dosage form, as described elsewhere herein, to provide a controlled release of the active agent over an extended period subsequent to the acute phase of treatment. Thus, in another embodiment, the peptides and compositions, as disclosed herein, are formulated for parenteral administration to the subject as a first dose and formulated as a controlled release dosage form to be administered to the subject after the first dose. In an embodiment, the controlled release dosage form is formulated for parental administration.

It may also be desirable to administer a first dose enterally (e.g., orally or rectally), followed by a subsequent (e.g., second, third, fourth, fifth, etc.) dose administered topically (e.g., transdermally). Thus, in an embodiment, the peptides and compositions, as disclosed herein, are formulated for enteral administration to the subject as a first dose (i.e., as an enteral dosage form; oral or rectal) and formulated for topical administration to the subject after the first dose (e.g., as a transdermal or transmucosal dosage form). In another embodiment, the peptides and compositions, as disclosed herein, are formulated for topical administration selected from the group consisting of transdermal and transmucosal administration. In a further embodiment, the peptides and compositions, as disclosed herein, are formulated for transdermal administration.

In yet another embodiment, it may be desirable to administer the peptides or compositions, as disclosed herein, enterally (e.g., orally or rectally) as a first dose, followed by a subsequent (e.g., second, third, fourth, fifth, etc.) dose as a controlled release dosage form, as described elsewhere herein. Thus, in an embodiment, the peptides and compositions, as disclosed herein, are formulated for administration as a first dose enterally and formulated for administration as a controlled release dosage form, wherein the controlled release dosage form is formulated for administration subsequent to the first dose. In an embodiment, the enteral dose is formulated for oral administration. In another embodiment, the controlled release dosage form is formulated for parenteral administration.

In an embodiment, it may be desirable to administer the peptides or compositions, as disclosed herein, topically (e.g., orally or rectally) as a first dose, followed by a subsequent (e.g., second, third, fourth, fifth, etc.) dose as a controlled release dosage form, as described elsewhere herein. Thus, in an embodiment, the peptides and compositions, as disclosed herein, are formulated for topical administration as a first dose and formulated for administration as a controlled release dosage form, wherein the controlled release dosage form is formulated for administration subsequent to the first topical dose. In an embodiment, the topical dose is formulated for transdermal administration. In another embodiment, the controlled release dosage form is formulated for parenteral administration.

The invention will now be described with reference to the following Examples which illustrate some preferred aspects of the present invention. However, it is to be understood that the particularity of the following description of the invention is not to supersede the generality of the preceding description of the invention.

EXAMPLES

Example 1: LanCL Binding Assay

Gel-Based Analysis of Crosslinked Proteins

Dry pellets of LANCL1 previously photolabelled with photoprobes in the presence of different peptides or PBS/DMSO vehicle were resuspended in 30 μL SDS loading buffer (Bio Rad's XT Sample Buffer containing 2.5% v/v 2-mercaptoethanol) and heated (60° C., 30 min). Proteins were resolved using SDS-PAGE (4-15% Criterion™ TGX Stain-Free™ Protein Gel, Bio Rad) and analyzed by in-gel fluorescence scanning using a ChemiDoc™ MP Imaging System (Bio Rad) with a green LED light as an excitation source and a BP600/20 nm emission filter. After in-gel fluorescence scanning, gels were stained with Coomassie blue to ensure the same amount of protein sample was loaded in each lane and imaged with the ChemiDoc™ MP Imaging System. Photoincorporation of each photoprobe in LANCL1 was quantitatively assessed by measuring the fluorescent intensity of the corresponding gel band using Image lab software (Bio Rad) and normalizing this value against the intensity value of LANCL1 gel band stained with Coomassie blue to control for loading differences.

Results

As shown in Table 2, peptides were found to specifically bind to LanCL1 and to displace a known LanCL1 ligand, PAL-CRSVEGSCGF (SEQ ID NO:22) from recombinant LanCL1 (rLanCL1). The $ED_{50}$ displacement values are shown in Table 2. Note that the cyclized peptide of SEQ ID NO:38 had unexpectedly greater binding affinity for rLanCL1 when compared to its linear counterpart, SEQ ID NO:37. Similarly, the cyclized peptide of SEQ ID NO:40 had better binding affinity for rLanCL1 when compared to its linear counterpart, SEQ ID NO:39.

TABLE 2

| Peptide Sequences (bold and underlined cysteine residues denote a cyclised peptide with a disulphide bond between said cysteine residues) | SEQ ID NO: | Displacement of SEQ ID NO: 22 from rLANCL1 ~ED50 displacement values |
|---|---|---|
| YLRIVQCRSVEGSCGF | 1 | ~50-100 μM |
| CRSVEGSCG | 3 | ~150 μM |
| CRSRPVESSCS | 14 | ~100 μM |
| CRIIHNNNC | 24 | ~100-200 μM |
| QEQLERALNSS | 37 | >100-200 μM |

TABLE 2-continued

| Peptide Sequences (bold and underlined cysteine residues denote a cyclised peptide with a disulphide bond between said cysteine residues) | SEQ ID NO: | Displacement of SEQ ID NO: 22 from rLANCL1 ~ED50 displacement values |
|---|---|---|
| CQEQLERALNSSC | 38 | ~50-100 µM |
| RALNSS | 39 | >200 µM |
| CRALNSSC | 40 | >50-100 µM |

Example 2: Respiratory Epithelial Cell Viability

By interacting with LANCL1, peptides described in this patent have been shown to play a role in protecting cells from the damaging effects of chemical or oxidative stress. An assay was developed that involves stressing cells with a dose of the chemotherapeutic agent, Taxol, that causes a 50% inhibition of cell viability when compared to untreated cells. Peptides were then added to the cell cultures at increasing concentrations to assess their ability to restore the viability of the Taxol-treated cells.

Briefly, A549 cells were cultured in opaque-walled multiwell plates with 50000 A549 cells/well in culture medium (DMEM medium ref 11960-044 Thermoscientific, +10% FBS ref 10270-106 Gibco, Thermoscientific, +1% Na pyruvate ref S8636-100 ML, Sigma, +1%, Glutamax ref35050061, Thermoscientific, +1% Penicillin-Streptomycin, ref 11074440001, Sigma) 100 µl per well for 96-well plates. Control wells containing medium without cells were used to obtain a value for background luminescence. Cells were incubated at 37° C. in 5% CO2 overnight.

Taxol (T7402-5 MG, Sigma-Aldrich) was added to each well as a 10 mM solution in DMSO to a final concentration of 350 µM which results in a 50% inhibition of proliferation compared with vehicle alone. 100 µL of medium+DMSO+peptides or medium+Taxol+peptides (at the different concentrations) were added to each well and incubated for 16 hours at 37° C. 5% CO2.

Cell morphology, viability and confluency were assessed by phase contrast microscopy. The CellTiter-Glo® Luminescent Cell Viability Assay (G7571, Promega—a homogeneous method to determine the number of viable cells in culture based on quantitation of the ATP present) was then used to quantify the number of metabolically active cells, according to the manufacturer's instructions. 100 µl volume of CellTiter-Glo® Reagent was added to the 100 µL volume of cell culture medium present in each well, Contents were mixed for 2 minutes on an orbital shaker to induce cell lysis and after incubating the plates at room temperature for 10 minutes to stabilize luminescent signal luminescence was recorded with an integration time of 0.5 seconds using a CLARIOstar multi well luminometer (BMG Labtech)

Results

Figure 2:
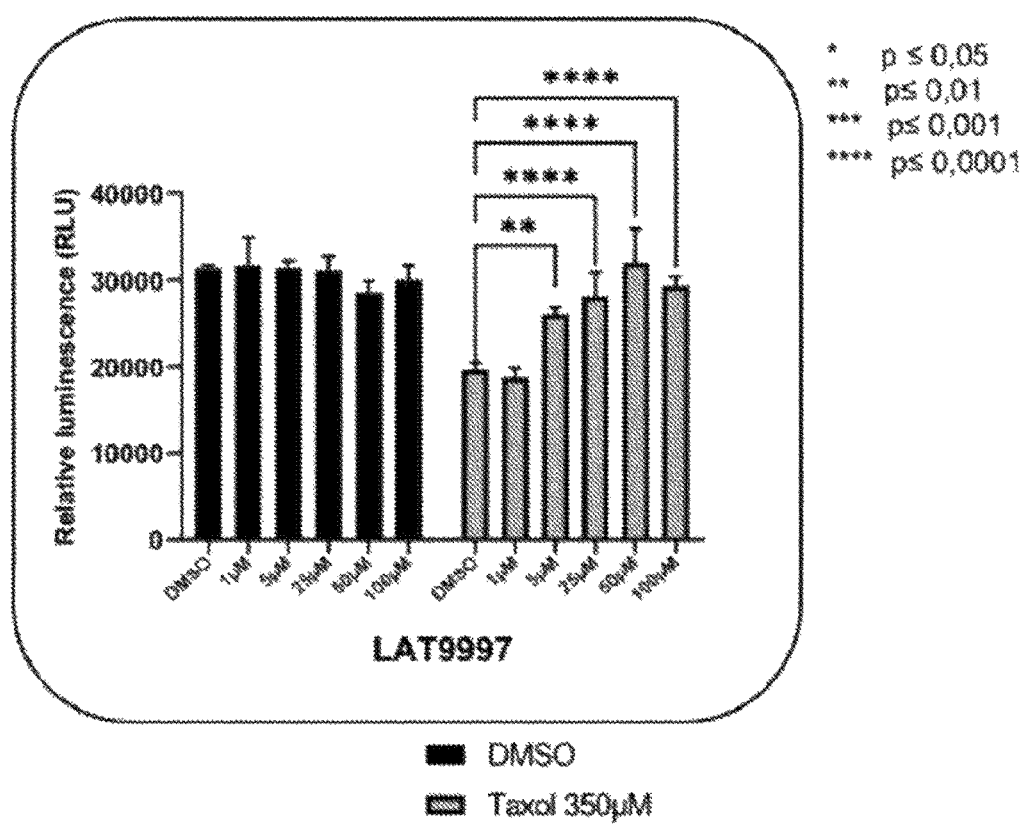
FIG. 2 shows the effect of the peptide of SEQ ID NO:9 on the viability of Taxol-stressed A549 cells. Cells were treated with Taxol ($IC_{50}$~350 μM) in the presence of either vehicle alone (DMSO) or in the presence of the peptide of SEQ ID NO:9 (diluted in DMSO) at a concentration of 1, 5, 25, 50 and 100 μM. Y-axis shows Relative luminescence Units (RLU); X-axis shows concentration of peptide.

As shown in Table 3, peptides were found to restore the viability of A549 cells that had been treated with a dose of Taxol that reduced their proliferation by 50% compared to untreated cells in vitro. Consistent with the LanCL1 binding data in Table 2, above, the cyclized peptide of SEQ ID NO:38 was found to restore A549 viability, whereas its linear counterpart, SEQ ID NO:37, did not. Similarly, the cyclized peptide of SEQ ID NO:10 was found to restore A549 viability, whereas its linear counterpart, SEQ ID NO:11, did not. Unexpectedly, relatively short peptides of 3-, 4-, 5- and 6-amino acids in length (SEQ ID NOs: 39, 42 and 59-61) were also found to partially restore A549 viability. The peptide of SEQ ID NO:40 (a cyclized variant of SEQ ID NO:39) also restored A549 viability. The peptide of SEQ ID NO:9 (a linear fragment of SEQ ID NO:1) also restored the Taxol-induced loss of cell viability (see also FIG. 2).

To assess whether the effect of the peptides was dependent on LanCL expression, A549 cells were treated with a LanCL1 siRNA (100 nM) for 48 hrs, which knocked down LanCL1 expression. Cells were then incubated in the presence of Taxol ($IC_{50}$~350 µM), either in the presence of vehicle alone (dimethylsulfoxide; DMSO) or in the presence of the peptide of SEQ ID NO: 1 (diluted in DMSO) at a concentration of 1, 5, 25, 50 and 100 µM. Transfection with control siRNA (SiCTL) or siRNA directed to LanCL1 (SiLanCL1) did not alter A549 cell viability. As shown in FIG. 1, the peptide of SEQ ID NO: 1 had no significant effect on the viability of non-transfected A549 cells (NT) or on A549 cells transfected with SiCTL in the absence of Taxol. In SiLanCL1-transfected cells, the peptide of SEQ ID NO: 1 inhibited A549 proliferation at higher doses.

In the presence of 350 µM Taxol, the presence of the peptide of SEQ ID NO: 1 rescued the loss of viability of non-transfected A549 cells (NT) or on A549 cells transfected with SiCTL. This effect is representative of a protective effect on epithelial cells). In contrast, the peptide of SEQ ID NO:1 did not rescue the negative effect of Taxol on A549 viability.

These data show peptides comprising the amino acid sequence of formula (I) are capable of rescuing the negative effect of Taxol-induced stress on epithelial cell viability and that this rescue effect is dependent on LanCL1.

TABLE 3

| Peptide Sequences (bold and underlined cysteine residues denote a cyclised peptide with a disulphide bond between said cysteine residues) | SEQ ID NO: | Estimated Activity in A549 proliferation + stress assay |
|---|---|---|
| YLRIVQCRSVEGSCGF | 1 | STRONG |
| CSGRVSECGF (scrambled intra-loop variant of SEQ ID NO: 2) | 8 | Inactive |

TABLE 3-continued

| Peptide Sequences (bold and underlined cysteine residues denote a cyclised peptide with a disulphide bond between said cysteine residues) | SEQ ID NO: | Estimated Activity in A549 proliferation + stress assay |
|---|---|---|
| RSVEGS | 9 | STRONG |
| SCRSRPVESSC | 10 | STRONG |
| SCRSRPVESSC (linear variant of SEQ ID NO: 10) | 11 | Inactive |
| CRSRPVESSCS | 14 | STRONG |
| CRIIHNNNC | 24 | STRONG |
| QEQLERALNSS | 37 | Inactive |
| CQEQLERALNSSC | 38 | MODERATE |
| RALNSS | 39 | WEAK |
| CRALNSSC | 40 | STRONG |
| KALPRS | 42 | STRONG |
| RALNS | 59 | WEAK-MODERATE |
| RALN | 60 | WEAK |
| RAL | 61 | WEAK |
| ALNSS | 63 | MODERATE |

Activity Scores:
  Inactive—no activity up to 100 µM;
  WEAK—some or variable restoration of cell viability at 50-100 µM;
  MODERATE—moderate dose-dependent restoration of cell viability at >25 µM;
  STRONG—clear dose-dependent restoration of cell viability from 1-5 µM upwards Example 3: Mouse Model of Influenza a Infection 6-8 week old C57BL/6 male mice were maintained in the Specific Pathogen Free Physical Containment Level 2 (PC2) Animal Research Facility at the Monash Medical Centre. All experimental procedures were approved by the Hudson Animal Ethics Committee and experimental procedures carried out in accordance with approved guidelines. The IAV strain used in this study was HKx31 (H3N2), which is a high-yielding reassortant of A/PR/8/34 (H1N1) that carries the surface glycoproteins of A/Aichi/2/1968 (H3N2). HKx31 was grown in 10-day embryonated chicken eggs by standard procedures and titrated on Madin-Darby Canine Kidney (MDCK) cells.

For virus infection studies, groups of 8 male C57BL/6 mice were randomized. Mice were lightly anesthetised and infected intranasally with $10^5$ PFU of HKx31 (H3N2) in 50 µl PBS (previously shown to induce severe disease (Rosli et al., 2019; Tate et al., 2016). Mice were treated at the time points indicated with peptides described herein (5 or 20 mg/kg; as indicated) via the intranasal route. Control mice were treated with PBS alone. Mice were weighed daily and assessed for visual signs of clinical disease, including inactivity, ruffled fur, laboured breathing, and huddling behaviour. Animals that lost ≥20% of their original body weight or displayed severe clinical signs of disease were euthanised. Bronchoalveolar lavage (BAL) fluid was immediately obtained following euthanisation by flushing the lungs three times with 1 mL of PBS. Lungs were then removed and frozen immediately in liquid nitrogen. Titres of infectious virus in lung homogenates were determined by standard plaque assay on MDCK cells.

Quantification of Cytokines in Mouse BAL Fluid and Sera

To detect cytokines, BAL fluid was collected and stored at −80° C. Levels of IL-6, MCP-1/CCL2, IFNγ, IL-10, IL-12p70, and TNFα proteins were determined by cytokine bead array (CBA) using the mouse inflammation kit (Becton Dickinson). Levels of mouse IFNα were determined by sandwich ELISA using mouse monoclonal clone F18 (Thermo Scientific) and rabbit polyclonal antibodies (PBL) (Thomas et al., 2014). Levels of mouse IFNβ were determined by sandwich ELISA using mouse monoclonal clone 7F-D3 (Abcam) and rabbit polyclonal antibodies (PBL) (Thomas et al., 2014). Mouse IFN $\lambda_{2/3}$ was quantified by ELISA (R&D Systems).

Recovery and Characterization of Leukocytes from Mice

For flow cytometric analysis, BAL cells were treated with red blood cell lysis buffer (Sigma Aldrich) and cell numbers and viability assessed via trypan blue exclusion using a haemocytometer. BAL cells were incubated with Fc block (2.4G2; eBiosciences), followed by staining with fluorochrome-conjugated monoclonal antibodies to Ly6C, Ly6G, CD11c and I-A$^b$ (MHC-II) (BD Biosciences, USA). Neutrophils (Ly6G$^+$), macrophages (CD11c$^+$ I-A$^b$ low), dendritic cells (DC; CD11c$^+$ I-A$^{b\ high}$), inflammatory macrophages (Ly6G$^-$ Ly6C$^+$) were quantified by flow cytometry, as described previously (Rosli et al., 2019; Tate et al., 2016). Live cells (propidium iodide negative) were analysed using a BD FACS Canto II flow cytometer (BD Biosciences) and FlowJo software (BD Biosciences).

Assessment of Lung Oedema and Vascular Leakage

The lung wet to dry weight ratio was used as an index of fluid accumulation in the lung. After euthanasia of mice, the lungs were surgically dissected, blotted dry, and weighed immediately (wet weight). The lung tissue was then dried in an oven at 55° C. for 72 hours and reweighed as dry weight. The ratio of wet to dry weight was calculated for each animal to assess tissue oedema (Tate et al., 2009; Tate et al., 2010). The concentration of protein in cell-free BAL supernatant was measured by adding Bradford protein dye (Tate et al., 2009; Tate et al., 2010). A standard curve using bovine serum albumin was constructed, and the optical density (OD) was determined at 595 nm.

Results

As shown in Table 4, treatment with the cyclic peptide of SEQ ID NO: 1 (10 mg/kg single dose) routinely reduces the infiltration of polymorphonuclear cells (PMN), viral titres and IL-6 levels in bronchiolar lavage fluid caused by the viral infection. At a single 10 mg/kg dose, the peptides of SEQ ID NOs: 1, 2, 9, 29, 37-39, 42, 56 and 59-61 were as effective as the peptide of SEQ ID NO:38 at reducing the PMN infiltrate in BAL fluid, whereas the peptides of SEQ ID NOs: 23, 40, 41, 50, 57 and 58 were relatively less effective than the peptide of SEQ ID NO:38 at reducing PMN infiltrate in BAL fluid at a single 10 mg/kg dose. Treatment with any one of the peptides of SEQ ID NOs: 43, 44, 47-49 and 52 did not show any changes in PMN infiltrate in BAL fluid at the single 10 mg/kg dose (Activity Scores: 0=inactive; 1=less active than the peptide of SEQ ID NO:38; 2=comparable or more active than the peptide of SEQ ID NO:38).

Compared to SEQ ID NO:38, treatment with any one of the peptides of SEQ ID NOS: 1, 9, 23, 29, 37, 38, 42, 50, 52, 56 and 59-61 (at a 10 mg/kg single dose) was shown to be effective at reducing viral titres at day 3.

Cytokine profiles were variable in lung and serum samples, but the data show that treatment with any one of the peptides of SEQ ID NOs: 1, 9, 23, 29, 37, 38, 42, 44, 47, 49, 50, 52, 56 and 59-61 was as effective at reducing IL-6 levels in the BAL fluid at comparable levels to the peptide of SEQ ID NO:38.

TABLE 4

| Amino Acid Sequences (bold and underlined cysteine residues denote a cyclised peptide with a disulphide bond between said cysteine residues) | SEQ ID NO: | PMN activity score | Viral titre activity score | BAL IL-6 activity score |
|---|---|---|---|---|
| YLRIVQCRSVEGSCGF | 1 | 2 | 2 | 2 |
| CRSVEGSCGF | 2 | 2 | | |
| RSVEGS | 9 | 2 | 2 | 2 |
| RPVESS | 23 | 1 | 2 | 1 |
| RIIHNN | 29 | 2 | 2 | 2 |
| QEQLERALNSS | 37 | 2 | 2 | 2 |
| CQEQLERALNSSC | 38 | 2 | 2 | 2 |
| RALNSS | 39 | 2 | 2 | 2 |
| CRALNSSC | 40 | 1 | 0 | 0 |
| RALNSS (cyclised; R1 conjugated to S6) | 41 | 1 | | |
| KALPRS | 42 | 2 | 2 | 2 |
| HIVESS | 44 | 0 | 1 | 2 |
| RAVESS | 47 | 0 | 1 | 2 |
| RALNST | 49 | 0 | 0 | 2 |
| RALQSS | 50 | 1 | 2 | 2 |
| PALNTS | 52 | 0 | 2 | 2 |
| RSVEG | 56 | 2 | 2 | 2 |
| RSVE | 57 | 1 | 0 | 0 |
| RSV | 58 | 1 | 0 | 0 |
| RALNS | 59 | 2 | 2 | 2 |
| RALN | 60 | 2 | 2 | 2 |
| RAL | 61 | 2 | 2 | 2 |

TABLE 4-continued

| Amino Acid Sequences (bold and underlined cysteine residues denote a cyclised peptide with a disulphide bond between said cysteine residues) | SEQ ID NO: | PMN activity score | Viral titre activity score | BAL IL-6 activity score |
|---|---|---|---|---|
| ALNSS | 63 | | 0 | |
| LNS | 64 | | 0 | |

Example 4: In Vivo Model of Neuropathic Pain

This study was undertaken to assess the analgesic effect of the peptides described herein on neuropathic pain in vivo using a nerve constriction model in Chung rats. Briefly, adult male Sprague-Dawley rats, 8-9 weeks old, weighing 220-250 g at the time of surgery, were purchased from Charles River UK Ltd.

The animals were housed in groups of 4 in an air-conditioned room on a 12-hour light/dark cycle. Food and water were available ad libitum. They were allowed to acclimatise to the experimental environment for three days by leaving them on a raised metal mesh for at least 40 min. The baseline paw withdrawal threshold (PWT) was examined using a series of graduated von Frey hairs for 3 consecutive days before surgery and re-assessed on the 6th to 8th day after surgery and on the 12th to 14th day after surgery before drug dosing.

Each rat was anaesthetized with 5% isoflurane mixed with oxygen (2 L per min) followed by an intramuscular (i.m.) injection of ketamine 90 mg/kg plus xylazine 10 mg/kg. The back was shaved and sterilized with povidone-iodine. The animal was placed in a prone position and a para-medial incision was made on the skin covering the L4-6 level. The L5 spinal nerve was carefully isolated and tightly ligated with 6/0 silk suture. The wound was then closed in layers after a complete hemostasis. A single dose of antibiotics (Amoxipen, 15 mg/rat, i.p.) was routinely given for prevention of infection after surgery. The animals were placed in a temperature-controlled recovery chamber until fully awake before being returned to their home cages.

The vehicle (1% DMSO in PBS) or peptide was administrated intramuscularly (i.m.) into the leg of the side contralateral to the site of injury. Dosing was carried out by a second experimenter. The rats with validated neuropathic pain state were randomly divided into 5 experimental groups: 1 ml/kg vehicle, 0.1, 0.5, 1 and 5 mg/kg peptide.

Each group had 8 animals. The animals were placed in individual Perspex boxes on a raised metal mesh for at least 40 minutes before the test. Starting from the filament of lowest force (about 1 g), each filament was applied perpendicularly to the centre of the ventral surface of the paw until slightly bent for 6 seconds. If the animal withdrew or lifted the paw upon stimulation, then a hair with force immediately lower than that tested was used. If no response was observed, then a hair with force immediately higher was tested. The lowest amount of force required to induce reliable responses (positive in 3 out of 5 trials) was recorded as the value of PWT.

The drug test was carried out on the 12th to 14th day after surgery. PWT were assessed before, 1, 2 and 4 hours following drug or vehicle administration. The animals were rested by being returned to their home cages (about 30-60 min) between two neighbouring testing time points. The peptides were administered by a single intramuscular injection (IM) in the ipsilateral limb at a dose of about 0.1 mg/kg body weight to about 5 mg/kg body weight.

Results

As shown in Table 5, below, the peptides of SEQ ID NOs: 1, 2, 3, 10, 24 and 37, including the 6-mer peptide of SEQ ID NO: 39, reduced neuropathic pain in the Chung model following oral, subcutaneous and/or intramuscular administration (oral doses in the range of 2-10 mg/kg, subcutaneous doses in the range of 0.1-3 mg/kg and intramuscular doses in the range of 0.5-5 mg/kg).

TABLE 5

| Amino Acid Sequences (bold and underlined cysteine residues denote a cyclised peptide with a disulphide bond between said cysteine residues) | SEQ ID NO: | In Vivo Activity Chung model of neuropathic pain |
|---|---|---|
| YLRIVQCRSVEGSCGF | 1 | +++ Oral, SC and IM administration |
| CRSVEGSCGF | 2 | +++ Oral and IM administration |
| CRSVEGSCG | 3 | +++ Oral and IM administration; |
| SCRSRPVESSC | 10 | +++ Oral and IM administration |
| CRIIHNNNC | 24 | +++ Oral and IM administration |
| QEQLERALNSS | 37 | ++ SC administration |
| RALNSS | 39 | +++ SC administration |

Example 5: In Vivo Model of Systemic Encephalomyocarditis Virus (EMCV) Infection In preliminary experiments using a systemic encephalomyocarditis virus (EMCV) infection mouse model, a reduction in neutrophil and inflammatory macrophages numbers was observed within the peritoneal cavity after intra-peritoneal administration with the peptides of SEQ ID NOs: 1, 37 and 38 (Table 6). This observation correlated with a reduction in circulating MCP-1, a cytokine that promotes migration and activation of both of these immune cells.

TABLE 6

| Amino Acid Sequences (bold and underlined cysteine residues denote a cyclised peptide with a disulphide bond between said cysteine residues) | SEQ ID NO: | Neutrophil infiltration in the peritoneum |
|---|---|---|
| YLRIVQ**<u>C</u>RSVEGS<u>C</u>**GF | 1 | Good activity |
| QEQLERALNSS | 37 | Modest activity |
| <u>C</u>QEQLERALNSS**<u>C</u>** | 38 | Good Activity |

Example 6: In Vivo Model of Neuropathic Pain (II)

The spinal nerve ligation (Chung) model was prepared as described in Example 4, above. Briefly, sixty-four adult male Sprague-Dawley rats, 8-9 weeks old, weighing 250-350 g at the time of surgery, were purchased from Charles River UK Ltd. The animals were housed in groups of 4 in an air-conditioned room on a 12-hour light/dark cycle. Food and water were available ad libitum. Animals were allowed to acclimatise to the environment for experiments for three days by leaving them on a raised metal mesh for at least 40 minutes. The baseline paw withdrawal threshold (PWT) was examined using a series of graduated von Frey hairs for 3 consecutive days before surgery and re-assessed on the 7th day after surgery and on the 12th to 14th day after surgery before drug dosing.

Each rat was anaesthetized with 5% isoflurane mixed with oxygen (2 L per min) followed by an intramuscular (i.m.) injection of ketamine 60 mg/kg plus xylazine 10 mg/kg. The back was shaved and sterilized with povidone-iodine. The animal was placed in a prone position and a para-medial incision was made on the skin covering the L4-6 level. The L5 spinal nerve was carefully isolated and tightly ligated with 6/0 silk suture. The wound was then closed in layers after a complete haemostasis. A single dose of antibiotics (Amoxipen, 15 mg/rat, i.p.) was routinely given for prevention of infection after surgery. The animals were placed in a temperature-controlled recovery chamber until fully awake before being returned to their home cages.

Animals with validated neuropathic pain state were randomly divided into 4 experimental groups: Vehicle (5% DMSO first then in 0.9% saline), 3 mg/kg LAT9997, 3 mg/kg LAT9997×1, and 3 mg/kg LAT1233×1. Each group contained 6 animals.

RSVEGS (SEQ ID NO:9; LAT9997), SVEGS (SEQ NO: 62; LAT9997×1) and ALNSS (SEQ ID NO:63; LAT1233×1) were dissolved in 5% DMSO first then in 0.9% saline, which also served as the vehicle control. All compounds were provided from GenScript for Lateral Pharma. All vehicle/compounds were administrated intravenously at 1 ml/kg body weight.

Paw Withdrawal Threshold (PWT)

The animals were placed in individual Perspex boxes on a raised metal mesh for at least 40 min. Starting from the filament of lowest force (1 gram (g)), each vFH filament was applied perpendicularly to the centre of the ventral surface of the paw until it slightly bent for 6 seconds. If the animal withdrew or lifted its paw upon stimulation, a filament with force immediately lower than that tested was used. If no response was observed, a filament with force immediately higher was then tested. The lowest amount of force required to induce reliable responses (positive in 2 out of 3 trials) was recorded as the value of the PWT.

PWT was assessed once daily for three days before surgery (pre D1, Pre D2 and D0) and on day 7 following surgery for monitoring the development of mechanical allodynia.

All drug tests were carried out on the $13^{th}$ to $17^{th}$ day after surgery. PWT was assessed before (BL) and 1 and 2 hours following drug or vehicle administration.

One-way analysis of variance (ANOVA) (IBM statistics SPSS, Version 27) was used for statistical analysis to compare PWT of different groups at the same time points. When appropriate, Fisher's Least Significant Difference (LSD) post-hoc test was used to compare drug treatment groups to the control groups. A paired Student's t-test (Microsoft Excel 365) was used to compare values of different time points in the same group. To characterise the drug-induced change in PWT relative to vehicle, vehicle values were subtracted from the appropriate drug values. The significance level was set at $P<0.05$.

Results

In naive rats (before surgery), the PWT ranged from 10.0 to 15.0 g. The mean PWT were 14.17±0.83 g and 15.00±0.00 g for the ipsilateral (left) and contralateral (right) hind paws in the vehicle group, respectively, on the day before surgery. The mean PWT for the LAT9997 group were 15.00±0.00 g for both the left and right hind paws, and 15.00±0.00 g for both the left and right hind paws in the LAT9997×1 and LAT1233×1 groups. There was no statistically significant difference among the groups ($P>0.05$, one-way ANOVA).

On day 7 after surgery, the PWT on the side ipsilateral to the ligated nerve were significantly lower than those determined pre-surgically (6.00±0.52 g for the vehicle group; 5.67±0.33 g for the LAT9997 group, 6.33±0.33 g for the LAT9997×1 group, and 5.33±0.42 g for the LAT1233×1 groups; $P<0.001$ for all groups compared to their pre-surgical values, paired Student's t-test). The PWT on the contralateral side were not significantly affected by surgery (14.17±0.83 g for the LAT1233×1 group; and 15.00±0.00 g for all other groups; P>0.05 for all groups compared to their pre-surgical values, paired Student's t-test).

Effect of Vehicle (5% DMSO) on PWT

Figure 3:
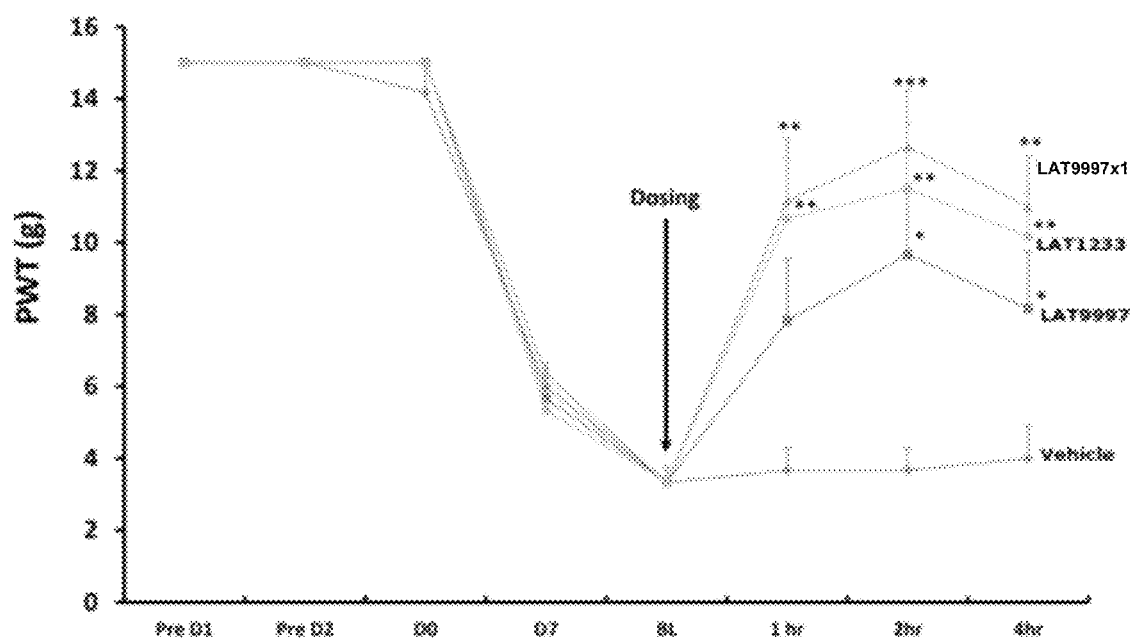
FIG. 3 shows the effect of peptides RSVEGS (SEQ ID NO:9), SVEGS (SEQ ID NO: 62) and ALNSS (SEQ ID NO:63) on the ipsilateral paw withdrawal threshold (PWT; grams) in a rat Chung model of neuropathic pain. *P<0.05, P<0.01 and *P<0.001 when compared to the Vehicle group (one-way ANOVA; n=6 per group).
Figure 4:
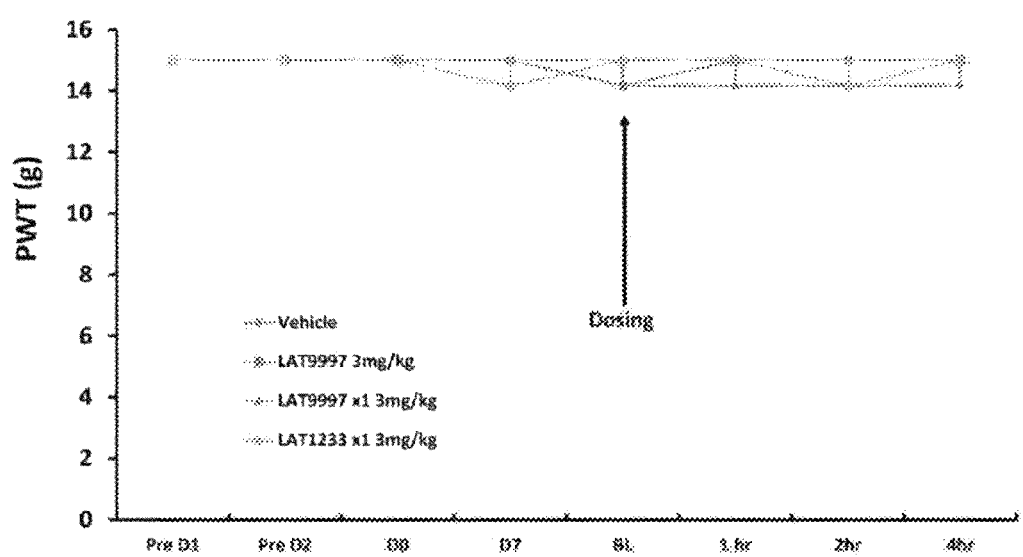
FIG. 4 shows the effect of peptides RSVEGS (SEQ ID NO:9), SVEGS (SEQ ID NO: 62) and ALNSS (SEQ ID NO:63) on the contralateral paw withdrawal threshold (PWT; grams) in a rat Chung model of neuropathic pain (one-way ANOVA; n=6 per group).

Prior to vehicle (5% DMSO) administration on the test day, the PWT on the (ipsilateral) hind paws were significantly lower compared to the contralateral hind paws: 3.33±0.42 g on the ipsilateral side and 14.17±0.83 g on the contralateral side (see FIGS. 3 and 4). After treatment with vehicle, the ipsilateral PWT was not significantly affected from 1 h to 4 h post-dosing amounting to: 3.67±0.61 g, 3.67±0.61 g, and 4.00±0.89 g for the 1, 2, and 4 hour time-points, respectively (all P>0.05, compared to the pre-dosing level, paired Student's t-test, see FIG. 3 and Table 7). On the contralateral side, the PWT remained unaffected (all 14.17±0.83 g at all time-points, see FIG. 4 and Table 8).

Effect of LAT9997 on the PWT

At 3 mg/kg, LAT9997 induced a significant increase in PWT of the ipsilateral hind paws in Chung model rats (see FIG. 3 and Table 7). The effect was significant from 1 hour after dosing: 3.33±0.42 g before dosing compared to 7.83±1.72 g at 1 hour after dosing (P<0.05, compared to the pre-dosing level, paired Student's t-test). At 2 hours after dosing, the PWT further increased to 9.67±1.73 g (P<0.01, compared to the pre-dosing level, paired Student's t-test). At 4 hours after dosing, the PWT slightly decreased to 8.17±1.60 g (P<0.05, compared to the pre-dosing level, paired Student's t-test). The PWT were significantly different to those recorded from the vehicle groups at 2 and 4 hours after dosing (both P<0.05, one-way ANOVA).

The PWT on the contralateral side did not change over the whole observation period (14.17±0.83 g at pre-dosing, 15.00±0.00 g at 1, 2 and 4 hours after dosing). The contralateral PWT were not significant different from those in the vehicle group at any time point post-dosing (P>0.05, one-way ANOVA, see FIG. 4 and Table 8).

Effect of LAT1233×1 on the PWT

At 3 mg/kg, LAT1233×1 also induced a sharp and significant increase in PWT of the ipsilateral hind paws in Chung model rats from 1 hour after dosing: 3.33±0.42 g before dosing compared to 10.67±1.67 g at 1 hour after dosing (P<0.01, compared to the pre-dosing level, paired Student's t-test). At 2 hours after dosing, the PWT slightly further increased to 11.50±1.80 g (P<0.01, compared to the pre-dosing level, paired Student's t-test). At 4 hours after dosing, the PWT slightly decreased to 10.17±1.17 g (P<0.01, compared to the pre-dosing level, paired Student's t-test). At all time-points after dosing, the PWT were significantly different to those recorded from the vehicle group (all P<0.01, one-way ANOVA; see FIG. 3 and Table 7).

The PWT on the contralateral side did not significantly change over the whole observation period (15.00±0.00 g for pre-dosing and 15.00±0.00 g, 14.17±0.83 g and 15.00±0.00 g at 1, 2 and 4 hours after dosing, respectively). The contralateral PWT were not significantly different from those in the vehicle group at any time point post-dosing (P>0.05, one-way ANOVA, see FIG. 4 and Table 8).

TABLE 7

Changes in ipsilateral PWT over time in Chung model rats following administration of LAT9997, LAT9997x1 and LAT1233x1.

| Treatment Groups | Paw withdrawal threshold (g) | | | |
|---|---|---|---|---|
| | Pre-dosing | 1 hour | 2 hours | 4 hours |
| Vehicle: 5% DMSO in saline | 3.33 ± 0.42 | 3.67 ± 0.61 | 3.67 ± 0.61 | 4.00 ± 0.89 |
| LAT9997 3 mg/kg | 3.33 ± 0.42 | 7.83 ± 1.72▲ | 9.67 ± 1.73▲ ▲* | 8.17 ± 1.60▲* |
| LAT9997x1 3 mg/kg | 3.33 ± 0.42 | 11.17 ± 1.74▲ ▲** | 12.67 ± 1.56▲ ▲*** | 11.00 ± 1.41▲ ▲** |
| LAT1233x1 3 mg/kg | 3.33 ± 0.42 | 10.67 ± 1.67▲ ▲** | 11.50 ± 1.80▲ ▲** | 10.17 ± 1.17▲ ▲** |

Each value represents the mean (±1 SEM). PWT expressed in g, as assessed with graduated von Frey hairs.
▲, ▲ ▲P < 0.05 and 0.01, respectively, compared to the pre-dosing value (paired Student's t-test);
*, , *P < 0.05, 0.01 and 0.001, respectively, compared to the vehicle group at the same time points (One-way ANOVA)

TABLE 8

Changes in contralateral PWT over time in Chung model rats following administration of LAT9997, LAT9997x1 and LAT1233x1.

| Treatment Groups | Paw withdrawal threshold (g) | | | |
|---|---|---|---|---|
| | Pre-dosing | 1 hour | 2 hours | 4 hours |
| Vehicle: 5% DMSO in saline | 14.17 ± 0.83 | 14.17 ± 0.83 | 14.17 ± 0.83 | 14.17 ± 0.83 |
| LAT9997 3 mg/kg | 14.17 ± 0.83 | 15.00 ± 0.00 | 15.00 ± 0.00 | 15.00 ± 0.00 |
| LAT9997x1 3 mg/kg | 15.00 ± 0.00 | 15.00 ± 0.00 | 15.00 ± 0.00 | 15.00 ± 0.00 |
| LAT1233x1 3 mg/kg | 15.00 ± 0.00 | 15.00 ± 0.00 | 14.17 ± 0.83 | 15.00 ± 0.00 |

Each value represents the mean (±1 SEM). PWT expressed in g, as assessed with graduated von Frey hairs.
There were no statistically-significant differences across time points in any of the treatment groups (paired Student's t-test), and between groups at the same time points
(One-way ANOVA). n = 6 for each group.

TABLE 9

| Peptides (bold and underlined cysteine residues denote a cyclised peptide with a disulphide bond between said cysteine residues) | SEQ ID NO: |
|---|---|
| YLRIVQCRSVEGSCGF | 1 |
| CRSVEGSCGF | 2 |
| CRSVEGSCG | 3 |
| CRSVEGSC | 4 |
| CRRFVESSCAF | 5 |
| CRRFVESSCA | 6 |
| PAL-CRSVEGSCG | 7 |
| CSGRVSECGF | 8 |
| RSVEGS | 9 |
| SCRSRPVESSC | 10 |
| SCRSRPVESSC (a linear, non-cyclized variant of SEQ ID NO: 10) | 11 |
| CNVPSSSHEEC | 12 |
| CRSRPVESSC | 13 |
| CRSRPVESSCS | 14 |
| SCRSRPVESSCS | 15 |
| IDPSSEAPGHSCRSRPVESSC | 16 |
| CRSRPVESSCSSKFSWDEYEQYKKE | 17 |
| SCRARPVESSC | 18 |
| SCRSRPAESSC | 19 |
| SCRSRPVEASC | 20 |
| SCRSRPVESAC | 21 |
| PAL-CRSRPVESSCS | 22 |
| RPVESS | 23 |
| CRIIHNNNC | 24 |
| CRIIHNNNCG | 25 |
| CRIVYDSNC | 26 |
| CRIVYDSNCG | 27 |
| PAL-CRIIHNNNC | 28 |
| RIIHNN | 29 |
| CRSRFVKKDGHC | 30 |
| GGSRFVLSQQALSC | 31 |
| FQDRVEFSGNPSK | 32 |
| CRNFFWKTFSSC | 33 |
| CVSSPC | 34 |
| RRRRRRRR | 35 |
| CRRRRRRRRC | 36 |

TABLE 9-continued

| Peptides (bold and underlined cysteine residues denote a cyclised peptide with a disulphide bond between said cysteine residues) | SEQ ID NO: |
|---|---|
| QEQLERALNSS | 37 |
| CQEQLERALNSSC | 38 |
| RALNSS | 39 |
| CRALNSSC | 40 |
| RALNSS (cyclised; R1 conjugated to S6) | 41 |
| KALPRS | 42 |
| RALRTK | 43 |
| HIVESS | 44 |
| HLADTS | 45 |
| RIVETS | 46 |
| RAVESS | 47 |
| RALNSSdaa (variant of SEQ ID NO: 39 with D-serine at position 6) | 48 |
| RALNST | 49 |
| RALQSS | 50 |
| RALNTS | 51 |
| PALNTS | 52 |
| RAINSS | 53 |
| RALNTT | 54 |
| RALNOS | 55 |
| RSVEG | 56 |
| RSVE | 57 |
| RSV | 58 |
| RALNS | 59 |
| RALN | 60 |
| RAL | 61 |
| SVEGS | 62 |
| ALNSS | 63 |
| LNS | 64 |
| EQLERALNSS | 65 |

SEQUENCE LISTING

```
Sequence total quantity: 69
SEQ ID NO: 1                moltype = AA  length = 16
FEATURE                     Location/Qualifiers
source                      1..16
                            mol_type = protein
                            organism = Synthetic construct
DISULFID                    7..14
                            note = Disulphide bond between Cys 7 and Cys 14
SEQUENCE: 1
YLRIVQCRSV EGSCGF                                                           16

SEQ ID NO: 2                moltype = AA  length = 10
FEATURE                     Location/Qualifiers
source                      1..10
                            mol_type = protein
                            organism = Synthetic construct
DISULFID                    1..8
                            note = Disulphide bond between Cys 1 and Cys 8
SEQUENCE: 2
CRSVEGSCGF                                                                  10

SEQ ID NO: 3                moltype = AA  length = 9
FEATURE                     Location/Qualifiers
source                      1..9
                            mol_type = protein
                            organism = Synthetic construct
DISULFID                    1..8
                            note = Disulphide bond between Cys 1 and Cys 8
SEQUENCE: 3
CRSVEGSCG                                                                    9

SEQ ID NO: 4                moltype = AA  length = 8
FEATURE                     Location/Qualifiers
source                      1..8
                            mol_type = protein
                            organism = Synthetic construct
DISULFID                    1..8
                            note = Disulphide bond between Cys 1 and Cys 8
SEQUENCE: 4
CRSVEGSC                                                                     8

SEQ ID NO: 5                moltype = AA  length = 11
FEATURE                     Location/Qualifiers
source                      1..11
                            mol_type = protein
                            organism = Synthetic construct
DISULFID                    1..9
                            note = Disulphide bond between Cys 1 and Cys 9
SEQUENCE: 5
CRRFVESSCA F                                                                11

SEQ ID NO: 6                moltype = AA  length = 10
FEATURE                     Location/Qualifiers
source                      1..10
                            mol_type = protein
                            organism = Synthetic construct
DISULFID                    1..9
                            note = Disulphide bond between Cys 1 and Cys 9
SEQUENCE: 6
CRRFVESSCA                                                                  10

SEQ ID NO: 7                moltype = AA  length = 9
FEATURE                     Location/Qualifiers
source                      1..9
                            mol_type = protein
                            organism = Synthetic construct
DISULFID                    1..8
                            note = Disulphide bond between Cys 1 and Cys 8
SEQUENCE: 7
CRSVEGSCG                                                                    9

SEQ ID NO: 8                moltype = AA  length = 10
FEATURE                     Location/Qualifiers
source                      1..10
                            mol_type = protein
                            organism = Synthetic construct
DISULFID                    1..8
                            note = Disulphide bond between Cys 1 and Cys 8
```

```
SEQUENCE: 8
CSGRVSECGF                                                              10

SEQ ID NO: 9            moltype = AA  length = 6
FEATURE                 Location/Qualifiers
source                  1..6
                        mol_type = protein
                        organism = Synthetic construct
SEQUENCE: 9
RSVEGS                                                                  6

SEQ ID NO: 10           moltype = AA  length = 11
FEATURE                 Location/Qualifiers
source                  1..11
                        mol_type = protein
                        organism = Synthetic construct
DISULFID                2..11
                        note = Disulphide bond between Cys 2 and Cys 11
SEQUENCE: 10
SCRSRPVESS C                                                            11

SEQ ID NO: 11           moltype = AA  length = 11
FEATURE                 Location/Qualifiers
source                  1..11
                        mol_type = protein
                        organism = Synthetic construct
SEQUENCE: 11
SCRSRPVESS C                                                            11

SEQ ID NO: 12           moltype = AA  length = 11
FEATURE                 Location/Qualifiers
source                  1..11
                        mol_type = protein
                        organism = Synthetic construct
DISULFID                1..11
                        note = Disulphide bond between Cys 1 and Cys 11
SEQUENCE: 12
CNVPSSSHEE C                                                            11

SEQ ID NO: 13           moltype = AA  length = 10
FEATURE                 Location/Qualifiers
source                  1..10
                        mol_type = protein
                        organism = Synthetic construct
DISULFID                1..10
                        note = Disulphide bond between Cys 1 and Cys 10
SEQUENCE: 13
CRSRPVESSC                                                              10

SEQ ID NO: 14           moltype = AA  length = 11
FEATURE                 Location/Qualifiers
source                  1..11
                        mol_type = protein
                        organism = Synthetic construct
DISULFID                1..10
                        note = Disulphide bond between Cys 1 and Cys 10
SEQUENCE: 14
CRSRPVESSC S                                                            11

SEQ ID NO: 15           moltype = AA  length = 12
FEATURE                 Location/Qualifiers
source                  1..12
                        mol_type = protein
                        organism = Synthetic construct
DISULFID                2..11
                        note = Disulphide bond between Cys 2 and Cys 11
SEQUENCE: 15
SCRSRPVESS CS                                                           12

SEQ ID NO: 16           moltype = AA  length = 21
FEATURE                 Location/Qualifiers
source                  1..21
                        mol_type = protein
                        organism = Synthetic construct
DISULFID                12..21
                        note = Disulphide bond between Cys 12 and Cys 21
SEQUENCE: 16
IDPSSEAPGH SCRSRPVESS C                                                 21
```

```
SEQ ID NO: 17           moltype = AA   length = 25
FEATURE                 Location/Qualifiers
source                  1..25
                        mol_type = protein
                        organism = Synthetic construct
DISULFID                1..10
                        note = Disulphide bond between Cys 1 and Cys 10
SEQUENCE: 17
CRSRPVESSC SSKFSWDEYE QYKKE                                          25

SEQ ID NO: 18           moltype = AA   length = 11
FEATURE                 Location/Qualifiers
source                  1..11
                        mol_type = protein
                        organism = Synthetic construct
DISULFID                2..11
                        note = Disulphide bond between Cys 2 and Cys 11
SEQUENCE: 18
SCRARPVESS C                                                         11

SEQ ID NO: 19           moltype = AA   length = 11
FEATURE                 Location/Qualifiers
source                  1..11
                        mol_type = protein
                        organism = Synthetic construct
DISULFID                2..11
                        note = Disulphide bond between Cys 2 and Cys 11
SEQUENCE: 19
SCRSRPAESS C                                                         11

SEQ ID NO: 20           moltype = AA   length = 11
FEATURE                 Location/Qualifiers
source                  1..11
                        mol_type = protein
                        organism = Synthetic construct
DISULFID                2..11
                        note = Disulphide bond between Cys 2 and Cys 11
SEQUENCE: 20
SCRSRPVEAS C                                                         11

SEQ ID NO: 21           moltype = AA   length = 11
FEATURE                 Location/Qualifiers
source                  1..11
                        mol_type = protein
                        organism = Synthetic construct
DISULFID                2..11
                        note = Disulphide bond between Cys 2 and Cys 11
SEQUENCE: 21
SCRSRPVESA C                                                         11

SEQ ID NO: 22           moltype = AA   length = 11
FEATURE                 Location/Qualifiers
source                  1..11
                        mol_type = protein
                        organism = Synthetic construct
DISULFID                1..10
                        note = Disulphide bond between Cys 1 and Cys 10
SEQUENCE: 22
CRSRPVESSC S                                                         11

SEQ ID NO: 23           moltype = AA   length = 6
FEATURE                 Location/Qualifiers
source                  1..6
                        mol_type = protein
                        organism = Synthetic construct
SEQUENCE: 23
RPVESS                                                                6

SEQ ID NO: 24           moltype = AA   length = 9
FEATURE                 Location/Qualifiers
source                  1..9
                        mol_type = protein
                        organism = Synthetic construct
DISULFID                1..9
                        note = Disulphide bond between Cys 1 and Cys 9
SEQUENCE: 24
CRIIHNNNC                                                             9

SEQ ID NO: 25           moltype = AA   length = 10
```

| FEATURE | Location/Qualifiers |
|---|---|
| source | 1..10 |
| | mol_type = protein |
| | organism = Synthetic construct |
| DISULFID | 1..9 |
| | note = Disulphide bond between Cys 1 and Cys 9 |

SEQUENCE: 25
CRIIHNNNCG								10

| SEQ ID NO: 26 | moltype = AA  length = 9 |
|---|---|
| FEATURE | Location/Qualifiers |
| source | 1..9 |
| | mol_type = protein |
| | organism = Synthetic construct |
| DISULFID | 1..9 |
| | note = Disulphide bond between Cys 1 and Cys 9 |

SEQUENCE: 26
CRIVYDSNC								9

| SEQ ID NO: 27 | moltype = AA  length = 10 |
|---|---|
| FEATURE | Location/Qualifiers |
| source | 1..10 |
| | mol_type = protein |
| | organism = Synthetic construct |
| DISULFID | 1..9 |
| | note = Disulphide bond between Cys 1 and Cys 9 |

SEQUENCE: 27
CRIVYDSNCG								10

| SEQ ID NO: 28 | moltype = AA  length = 9 |
|---|---|
| FEATURE | Location/Qualifiers |
| source | 1..9 |
| | mol_type = protein |
| | organism = Synthetic construct |
| DISULFID | 1..9 |
| | note = Disulphide bond between Cys 1 and Cys 9 |

SEQUENCE: 28
CRIIHNNNC								9

| SEQ ID NO: 29 | moltype = AA  length = 6 |
|---|---|
| FEATURE | Location/Qualifiers |
| source | 1..6 |
| | mol_type = protein |
| | organism = Synthetic construct |

SEQUENCE: 29
RIIHNN									6

| SEQ ID NO: 30 | moltype = AA  length = 12 |
|---|---|
| FEATURE | Location/Qualifiers |
| source | 1..12 |
| | mol_type = protein |
| | organism = Synthetic construct |
| DISULFID | 1..12 |
| | note = Disulphide bond between Cys 1 and Cys 12 |

SEQUENCE: 30
CRSRFVKKDG HC								12

| SEQ ID NO: 31 | moltype = AA  length = 14 |
|---|---|
| FEATURE | Location/Qualifiers |
| source | 1..14 |
| | mol_type = protein |
| | organism = Synthetic construct |

SEQUENCE: 31
GGSRFVLSQQ ALSC								14

| SEQ ID NO: 32 | moltype = AA  length = 13 |
|---|---|
| FEATURE | Location/Qualifiers |
| source | 1..13 |
| | mol_type = protein |
| | organism = Synthetic construct |

SEQUENCE: 32
FQDRVEFSGN PSK								13

| SEQ ID NO: 33 | moltype = AA  length = 12 |
|---|---|
| FEATURE | Location/Qualifiers |
| source | 1..12 |
| | mol_type = protein |
| | organism = Synthetic construct |
| DISULFID | 1..12 |

```
                        note = Disulphide bond between Cys 1 and Cys 12
SEQUENCE: 33
CRNFFWKTFS SC                                                      12

SEQ ID NO: 34           moltype = AA   length = 6
FEATURE                 Location/Qualifiers
source                  1..6
                        mol_type = protein
                        organism = Synthetic construct
DISULFID                1..6
                        note = Disulphide bond between Cys 1 and Cys 6
SEQUENCE: 34
CVSSPC                                                              6

SEQ ID NO: 35           moltype = AA   length = 8
FEATURE                 Location/Qualifiers
source                  1..8
                        mol_type = protein
                        organism = Synthetic construct
SEQUENCE: 35
RRRRRRRR                                                            8

SEQ ID NO: 36           moltype = AA   length = 10
FEATURE                 Location/Qualifiers
source                  1..10
                        mol_type = protein
                        organism = Synthetic construct
DISULFID                1..10
                        note = Disulphide bond between Cys 1 and Cys 10
SEQUENCE: 36
CRRRRRRRRC                                                         10

SEQ ID NO: 37           moltype = AA   length = 11
FEATURE                 Location/Qualifiers
source                  1..11
                        mol_type = protein
                        organism = Synthetic construct
SEQUENCE: 37
QEQLERALNS S                                                       11

SEQ ID NO: 38           moltype = AA   length = 13
FEATURE                 Location/Qualifiers
source                  1..13
                        mol_type = protein
                        organism = Synthetic construct
DISULFID                1..13
                        note = Disulphide bond between Cys 1 and Cys 13
SEQUENCE: 38
CQEQLERALN SSC                                                     13

SEQ ID NO: 39           moltype = AA   length = 6
FEATURE                 Location/Qualifiers
source                  1..6
                        mol_type = protein
                        organism = Synthetic construct
SEQUENCE: 39
RALNSS                                                              6

SEQ ID NO: 40           moltype = AA   length = 8
FEATURE                 Location/Qualifiers
source                  1..8
                        mol_type = protein
                        organism = Synthetic construct
DISULFID                1..8
                        note = Disulphide bond between Cys 1 and Cys 8
SEQUENCE: 40
CRALNSSC                                                            8

SEQ ID NO: 41           moltype = AA   length = 6
FEATURE                 Location/Qualifiers
source                  1..6
                        mol_type = protein
                        organism = Synthetic construct
SITE                    1
                        note = Arg 1 is bonded to Ser 6
SITE                    6
                        note = Ser 6 is bonded to Arg 1
SEQUENCE: 41
RALNSS                                                              6
```

```
SEQ ID NO: 42           moltype = AA  length = 6
FEATURE                 Location/Qualifiers
source                  1..6
                        mol_type = protein
                        organism = Synthetic construct
SEQUENCE: 42
KALPRS                                                                    6

SEQ ID NO: 43           moltype = AA  length = 6
FEATURE                 Location/Qualifiers
source                  1..6
                        mol_type = protein
                        organism = Synthetic construct
SEQUENCE: 43
RALRTK                                                                    6

SEQ ID NO: 44           moltype = AA  length = 6
FEATURE                 Location/Qualifiers
source                  1..6
                        mol_type = protein
                        organism = Synthetic construct
SEQUENCE: 44
HIVESS                                                                    6

SEQ ID NO: 45           moltype = AA  length = 6
FEATURE                 Location/Qualifiers
source                  1..6
                        mol_type = protein
                        organism = Synthetic construct
SEQUENCE: 45
HLADTS                                                                    6

SEQ ID NO: 46           moltype = AA  length = 6
FEATURE                 Location/Qualifiers
source                  1..6
                        mol_type = protein
                        organism = Synthetic construct
SEQUENCE: 46
RIVETS                                                                    6

SEQ ID NO: 47           moltype = AA  length = 6
FEATURE                 Location/Qualifiers
source                  1..6
                        mol_type = protein
                        organism = Synthetic construct
SEQUENCE: 47
RAVESS                                                                    6

SEQ ID NO: 48           moltype = AA  length = 6
FEATURE                 Location/Qualifiers
source                  1..6
                        mol_type = protein
                        organism = Synthetic construct
SITE                    6
                        note = D-Serine
SEQUENCE: 48
RALNSS                                                                    6

SEQ ID NO: 49           moltype = AA  length = 6
FEATURE                 Location/Qualifiers
source                  1..6
                        mol_type = protein
                        organism = Synthetic construct
SEQUENCE: 49
RALNST                                                                    6

SEQ ID NO: 50           moltype = AA  length = 6
FEATURE                 Location/Qualifiers
source                  1..6
                        mol_type = protein
                        organism = Synthetic construct
SEQUENCE: 50
RALQSS                                                                    6

SEQ ID NO: 51           moltype = AA  length = 6
FEATURE                 Location/Qualifiers
source                  1..6
                        mol_type = protein
```

```
                        organism = Synthetic construct
SEQUENCE: 51
RALNTS                                                                          6

SEQ ID NO: 52           moltype = AA   length = 6
FEATURE                 Location/Qualifiers
source                  1..6
                        mol_type = protein
                        organism = Synthetic construct
SEQUENCE: 52
PALNTS                                                                          6

SEQ ID NO: 53           moltype = AA   length = 6
FEATURE                 Location/Qualifiers
source                  1..6
                        mol_type = protein
                        organism = Synthetic construct
SEQUENCE: 53
RAINSS                                                                          6

SEQ ID NO: 54           moltype = AA   length = 6
FEATURE                 Location/Qualifiers
source                  1..6
                        mol_type = protein
                        organism = Synthetic construct
SEQUENCE: 54
RALNTT                                                                          6

SEQ ID NO: 55           moltype = AA   length = 6
FEATURE                 Location/Qualifiers
source                  1..6
                        mol_type = protein
                        organism = Synthetic construct
SEQUENCE: 55
RALNQS                                                                          6

SEQ ID NO: 56           moltype = AA   length = 5
FEATURE                 Location/Qualifiers
source                  1..5
                        mol_type = protein
                        organism = Synthetic construct
SEQUENCE: 56
RSVEG                                                                           5

SEQ ID NO: 57           moltype = AA   length = 4
FEATURE                 Location/Qualifiers
source                  1..4
                        mol_type = protein
                        organism = Synthetic construct
SEQUENCE: 57
RSVE                                                                            4

SEQ ID NO: 58           moltype =    length =
SEQUENCE: 58
000

SEQ ID NO: 59           moltype = AA   length = 5
FEATURE                 Location/Qualifiers
source                  1..5
                        mol_type = protein
                        organism = Synthetic construct
SEQUENCE: 59
RALNS                                                                           5

SEQ ID NO: 60           moltype = AA   length = 4
FEATURE                 Location/Qualifiers
source                  1..4
                        mol_type = protein
                        organism = Synthetic construct
SEQUENCE: 60
RALN                                                                            4

SEQ ID NO: 61           moltype =    length =
SEQUENCE: 61
000

SEQ ID NO: 62           moltype = AA   length = 5
FEATURE                 Location/Qualifiers
source                  1..5
```

```
                        mol_type = protein
                        organism = Synthetic construct
SEQUENCE: 62
SVEGS                                                                   5

SEQ ID NO: 63           moltype = AA  length = 5
FEATURE                 Location/Qualifiers
source                  1..5
                        mol_type = protein
                        organism = Synthetic construct
SEQUENCE: 63
ALNSS                                                                   5

SEQ ID NO: 64           moltype =     length =
SEQUENCE: 64
000

SEQ ID NO: 65           moltype = AA  length = 10
FEATURE                 Location/Qualifiers
source                  1..10
                        mol_type = protein
                        organism = Synthetic construct
SEQUENCE: 65
EQLERALNSS                                                             10

SEQ ID NO: 66           moltype = AA  length = 4
FEATURE                 Location/Qualifiers
source                  1..4
                        mol_type = protein
                        organism = synthetic construct
SEQUENCE: 66
RPVE                                                                    4

SEQ ID NO: 67           moltype = AA  length = 5
FEATURE                 Location/Qualifiers
source                  1..5
                        mol_type = protein
                        organism = synthetic construct
SEQUENCE: 67
RPVES                                                                   5

SEQ ID NO: 68           moltype = AA  length = 4
FEATURE                 Location/Qualifiers
source                  1..4
                        mol_type = protein
                        organism = synthetic construct
SEQUENCE: 68
RIIH                                                                    4

SEQ ID NO: 69           moltype = AA  length = 5
FEATURE                 Location/Qualifiers
source                  1..5
                        mol_type = protein
                        organism = synthetic construct
SEQUENCE: 69
RIIHN                                                                   5
```

What is claimed is:

1. A linear peptide, wherein the amino acid sequence of the linear peptide consists of the amino acid sequence RSVEGS (SEQ ID NO:9).

2. A pharmaceutical composition comprising the linear peptide of claim 1.

3. A method of treating a condition in a subject in need thereof, the method comprising administering to a subject in need thereof a therapeutically-effective amount of the linear peptide of claim 1.

4. The method of claim 3, wherein the method comprises administering the peptide to the subject by subcutaneous injection.

5. The method of claim 3, wherein the condition is pain.

6. The method of claim 3, wherein the condition is neuropathic pain.

7. The method of claim 3, wherein the condition is a respiratory tract infection.

* * * * *